(12) United States Patent
Asanuma et al.

(10) Patent No.: US 8,423,776 B2  
(45) Date of Patent: Apr. 16, 2013

(54) STORAGE SYSTEMS AND DATA STORAGE METHOD

(75) Inventors: Kaoru Asanuma, Oi (JP); Fumihiko Etou, Gotenba (JP); Kazunari Honda, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1096 days.

(21) Appl. No.: 11/475,931

(22) Filed: Jun. 28, 2006

(65) Prior Publication Data

US 2007/0255950 A1    Nov. 1, 2007

(30) Foreign Application Priority Data

Apr. 28, 2006    (JP) .................................. 2006-125090

(51) Int. Cl.  
*H04L 29/06*    (2006.01)

(52) U.S. Cl.  
USPC ............................................................ 713/176

(58) Field of Classification Search .............. 711/161–5; 714/5, 6; 707/201–205  
See application file for complete search history.

(56) References Cited

U.S. PATENT DOCUMENTS

| | | | |
|---|---|---|---|
| 5,611,069 A * | 3/1997 | Matoba | 711/114 |
| 6,269,431 B1 * | 7/2001 | Dunham | 711/162 |
| 6,366,987 B1 * | 4/2002 | Tzelnic et al. | 711/162 |
| 6,411,943 B1 * | 6/2002 | Crawford | 705/400 |
| 2003/0046260 A1 * | 3/2003 | Satyanarayanan et al. | 707/1 |
| 2005/0223164 A1 * | 10/2005 | Kitamura | 711/112 |

FOREIGN PATENT DOCUMENTS

| | | |
|---|---|---|
| JP | 7-129331 | 5/1995 |
| JP | 2005-301980 | 10/2005 |

* cited by examiner

*Primary Examiner* — William Goodchild  
(74) *Attorney, Agent, or Firm* — Brundidge & Stanger, P.C.

(57) ABSTRACT

Proposed are a storage system and a data storage method capable of automatically and flexibly changing the redundant destination of data, and verifying the authenticity of data when a system is changed. A primary storage apparatus includes a search unit for searching a secondary storage apparatus for storing the redundant data, and a primary creation unit for creating primary-side authentic information showing that the data is authentic. A secondary storage apparatus includes a secondary creation unit for creating secondary-side authentic information showing that the redundant data is authentic. This storage system also includes a primary storage unit for storing the data in a storage extent of the primary storage apparatus and a secondary storage unit for storing the redundant data in a storage extent of the secondary storage apparatus when the primary-side authentic information and the secondary-side authentic information coincide.

6 Claims, 25 Drawing Sheets

FIG.3

| APPARATUS ID | INDIVIDUAL IDENTIFICATION ID |
|---|---|
| S0 | ×x-×x-×x-×x-×x-×A |
| S1 | ×x-×x-×x-×x-×x-×B |
| ⋮ | ⋮ |
| Sn | ×x-×x-×x-×x-×x-×N |

| DATA ID | STORAGE DESTINATION AREA | | | REDUNDANT DESTINATION STORAGE AREA | | DATA CREATION DATE | FINAL CHECK DATE |
| --- | --- | --- | --- | --- | --- | --- | --- |
| | PARITY GROUP | TOP ADDRESS | DATA LENGTH | APPARATUS ID | DATA ID | | |
| D0 | PG1 | X0000 | 1024 | S1 | D0 | 2006-01-01 | 2006-02-01 |
| D1 | PG2 | X1000 | 1024 | S2 | D1 | 2006-01-01 | 2006-02-01 |
| ... | ... | ... | ... | ... | ... | ... | ... |
| Dn | PGn | X2000 | 1024 | Sn | Dn | yyyy-mm-dd | yyyy-mm-dd |

| AREA ID (322A) | STORAGE AREA (322B) | | |
|---|---|---|---|
| | PARITY GROUP (322C) | TOTAL CAPACITY (322D) | UNUSED CAPACITY (322E) |
| A0 | PG1 | 300GB | 250GB |
| A1 | PG2 | 300GB | 30GB |
| ⋅ | ⋅ | ⋅ | ⋅ |
| ⋅ | ⋅ | ⋅ | ⋅ |
| ⋅ | ⋅ | ⋅ | ⋅ |
| An | PGn | 300GB | 200GB |

| HARD DISK ID (323A) | AREA ID (323B) | ERROR COUNT (323C) | START DATE OF USE (323D) | CUMULATIVE OPERATING TIME (323E) |
|---|---|---|---|---|
| H0 | A0 | 0000 | 2006-01-01 | 744h |
| H1 | A1 | 0001 | 2006-01-01 | 744h |
| ⋅ | ⋅ | ⋅ | ⋅ | ⋅ |
| ⋅ | ⋅ | ⋅ | ⋅ | ⋅ |
| ⋅ | ⋅ | ⋅ | ⋅ | ⋅ |
| Hn | An | 0000 | yyyy-mm-dd | 744h |

323

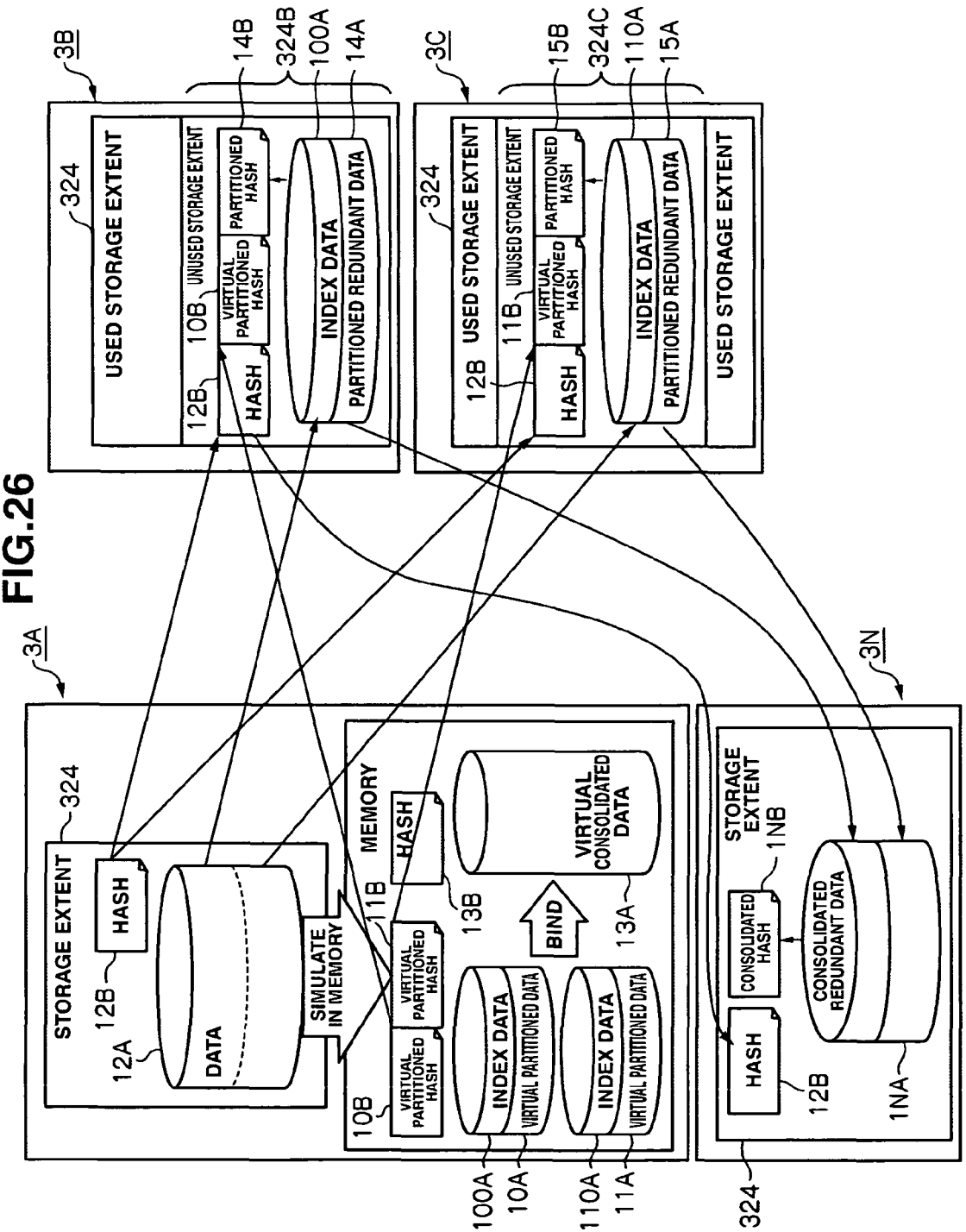

STORAGE SYSTEMS AND DATA STORAGE METHOD

CROSS-REFERENCES TO RELATED APPLICATIONS

This application relates to and claims priority from Japanese Patent Application No. 2006-125090, filed on 28, Apr. 2006, the entire disclosure of which is incorporated herein by reference.

BACKGROUND

The present invention generally relates to a storage system and a data storage method, and in particular is suitably employed in a storage system required to store data for an extended period of time.

In the present age, storage systems are required to store large volumes of data for an extended period of time across the globe. Nevertheless, since data must be stored beyond the life span of an external storage apparatus, it is necessary to prevent the loss of data upon the occurrence of a failure such as a malfunction in the storage system itself, or upon the replacement of the storage system due to internal improvement.

Thus, Japanese Patent Laid-Open Publication No. H7-129331 (Patent Document 1) discloses technology for preventing loss of data by using the storage apparatuses in a storage system as a pair of active storage apparatus and backup storage apparatus. According to this technology, by determining the occurrence of a failure such as a malfunction of the storage apparatus beforehand, it is possible to switch the main apparatus from the active storage apparatus to the backup storage apparatus in advance.

In addition, Japanese Patent Laid-Open Publication No. 2005-301980 (Patent Document 2) disclosed technology for storing data by controlling the access from a host system to a storage system upon replacing the storage system for improvement, and recording a time stamp (current date and time) provided from a clock circuit inside the storage system as a log in a memory. According to this technology, it is possible to accurately grasp the operational status of the storage system at the present moment.

SUMMARY

Nevertheless, with the technology proposed in Patent Document 1, it is necessary to prepare a plurality of pairs of storage apparatuses at all times in advance, and double the capacity of a storage apparatus normally operated alone will be required. Further, with this kind of technology, there is a problem in that the backup storage apparatus as the redundant destination cannot be changed flexibly.

Moreover, with the technology proposed in Patent Document 2, although records of logs will remain in the storage system, since records of data per se will not remain, there is a problem in that it is difficult to verify the authenticity of data if the logs are falsified.

The present invention was made in view of the foregoing conventional problems. Thus, an object of the present invention is to propose a storage system and a data storage method capable of automatically and flexibly changing the redundant destination of data, and verifying the authenticity of data when a system is changed.

In order to achieve the foregoing object, the present invention provides a storage system comprising at least two or more primary storage apparatuses having a storage extent for storing data and secondary storage apparatuses having redundant data of the data. The primary storage apparatus comprises a search unit for searching a secondary storage apparatus for storing the redundant data, and a primary creation unit for creating primary-side authentic information showing that the data is authentic. The secondary storage apparatus comprises a secondary creation unit for creating secondary-side authentic information showing that the redundant data is authentic. The storage system further comprises a primary storage unit for storing the data in a storage extent of the primary storage apparatus and a secondary storage unit for storing the redundant data in a storage extent of the secondary storage apparatus when the primary-side authentic information and the secondary-side authentic information coincide.

Thus, with this storage system, the primary storage apparatus is able to flexibly search the secondary storage apparatus as the storage destination of redundant data, and the same data can be stored in at least two or more locations at all times in the primary storage apparatus and the secondary storage apparatus.

The present invention also provides a data storage method of a storage system comprising at least two or more primary storage apparatuses having a storage extent for storing data and secondary storage apparatuses having redundant data of the data. This data storage method comprises the steps of the primary storage apparatus searching a secondary storage apparatus for storing the redundant data, and creating primary-side authentic information showing that the data is authentic, the secondary storage apparatus creating secondary-side authentic information showing that the redundant data is authentic, and storing the data in a storage extent of the primary storage apparatus and storing the redundant data in a storage extent of the secondary storage apparatus when the primary-side authentic information and the secondary-side authentic information coincide.

Thus, with this data storage method, the primary storage apparatus is able to flexibly search the secondary storage apparatus as the storage destination of redundant data, and the same data can be stored in at least two or more locations at all times in the primary storage apparatus and the secondary storage apparatus.

According to the present invention, it is possible to automatically and flexibly change the redundant destination of data, and verify the authenticity of data when a system is changed.

DESCRIPTION OF DRAWINGS

FIG. 3 is a conceptual diagram showing the apparatus table of the storage apparatus;

FIG. 4 is a conceptual diagram showing the data management table of the storage apparatus;

FIG. 6 is a conceptual diagram showing the storage management table of the storage apparatus;

FIG. 7 is a conceptual diagram showing the statistical information table of the storage apparatus;

FIG. 26 is an explanatory diagram showing the processing contents of the CPU of the storage apparatus relating to data consolidation processing and data protection processing.

DETAILED DESCRIPTION

An embodiment of the present invention is now explained in detail with reference to the attached drawings.

There are cases when it is necessary to store data for an extended period of time beyond the life span of a storage apparatus such as a disk device or a flash memory. During this period when data needs to be stored, there may be cases where it is necessary to replace the storage apparatus due to a malfunction or aging of such storage apparatus. In addition, there are cases where the number of storage apparatuses must be increased or the storage apparatus is changed to a dissimilar device pursuant to changes in the data volume to be stored or the system configuration.

As a result of such change in the storage system configuration or replacement of the storage apparatus, there are cases where it is difficult to continue storing the stored data to be stored for an extended period of time in the same conventional storage apparatus, and it becomes necessary to migrate such data.

The present embodiment provides a function and method that guarantees the consistency of the data contents even when it is necessary to migrate data during the long-term storage period thereof in relation to data to be stored for an extended period of time beyond the life span of the storage apparatus. The present embodiment also provides a function and method of confirming the authenticity of the respective partitioned data even when it is necessary to partition and store such data in the storage apparatus due to the replacement of the storage apparatus or change in the system configuration.

(1) Configuration of Storage System in Present Embodiment

Figure 1:
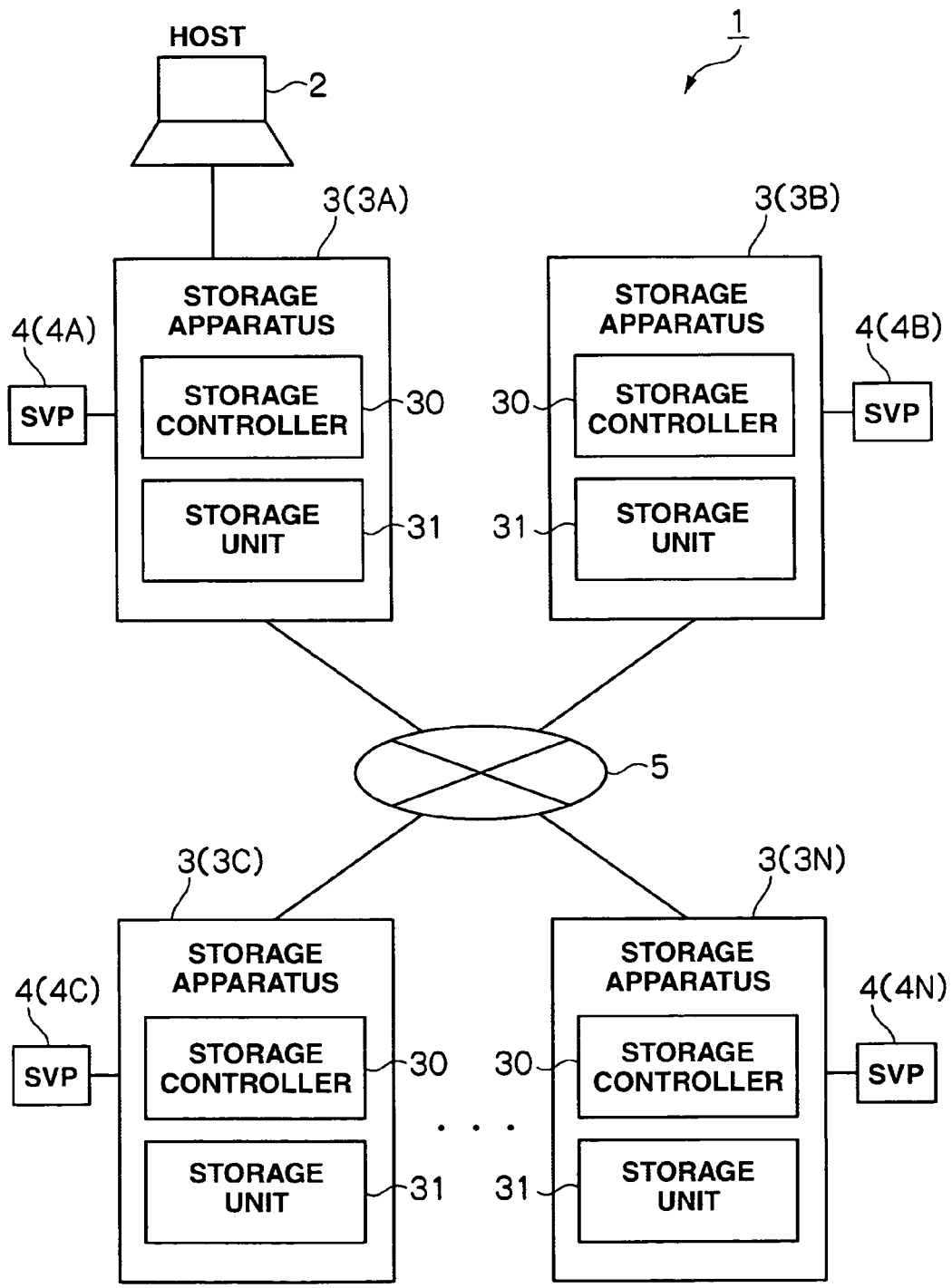
FIG. 1 is a block diagram showing the overall configuration of the storage system according to an embodiment of the present invention.

FIG. 1 shows the overall storage system 1 according to the present embodiment. The storage system 1 comprises a plurality of storage apparatus 3, to which a service processor 4 is connected respectively, connected via a network 5, and a host system 2 connected to one storage apparatus 3A among such plurality of storage apparatuses 3.

The host system 2 is a computer device comprising information processing resources such as a CPU (Central Processing Unit) and memory, and, for instance, is configured from a personal computer, workstation, or mainframe. The host system 2 has an information input device (not shown) such as a keyboard, switch, pointing device or microphone, and an information output device (not shown) such as a monitor display or speaker.

The network 5, for example, is configured from a SAN (Storage Area Network), LAN (Local Area Network), the Internet, dedicated line or public line. Communication between the host system 2 and the respective storage apparatuses via the network 5 is conducted according to a fibre channel protocol when the network 5 is a SAN, and conducted according to a TCP/IP (Transmission Control Protocol/Internet Protocol) protocol when the network 5 is a LAN.

The service processor 4 is a computer device to be operated for the maintenance or management of the storage apparatus 3, and, for instance, is configured from a laptop personal computer. The service processor 4 is connected to the host system 2 via the storage apparatus 3, and is capable of receiving data or commands from the host system 2. The service processor 4 is able to monitor the occurrence of a failure in the storage apparatus 3 and display such failure on a display screen (not shown).

Figure 2:
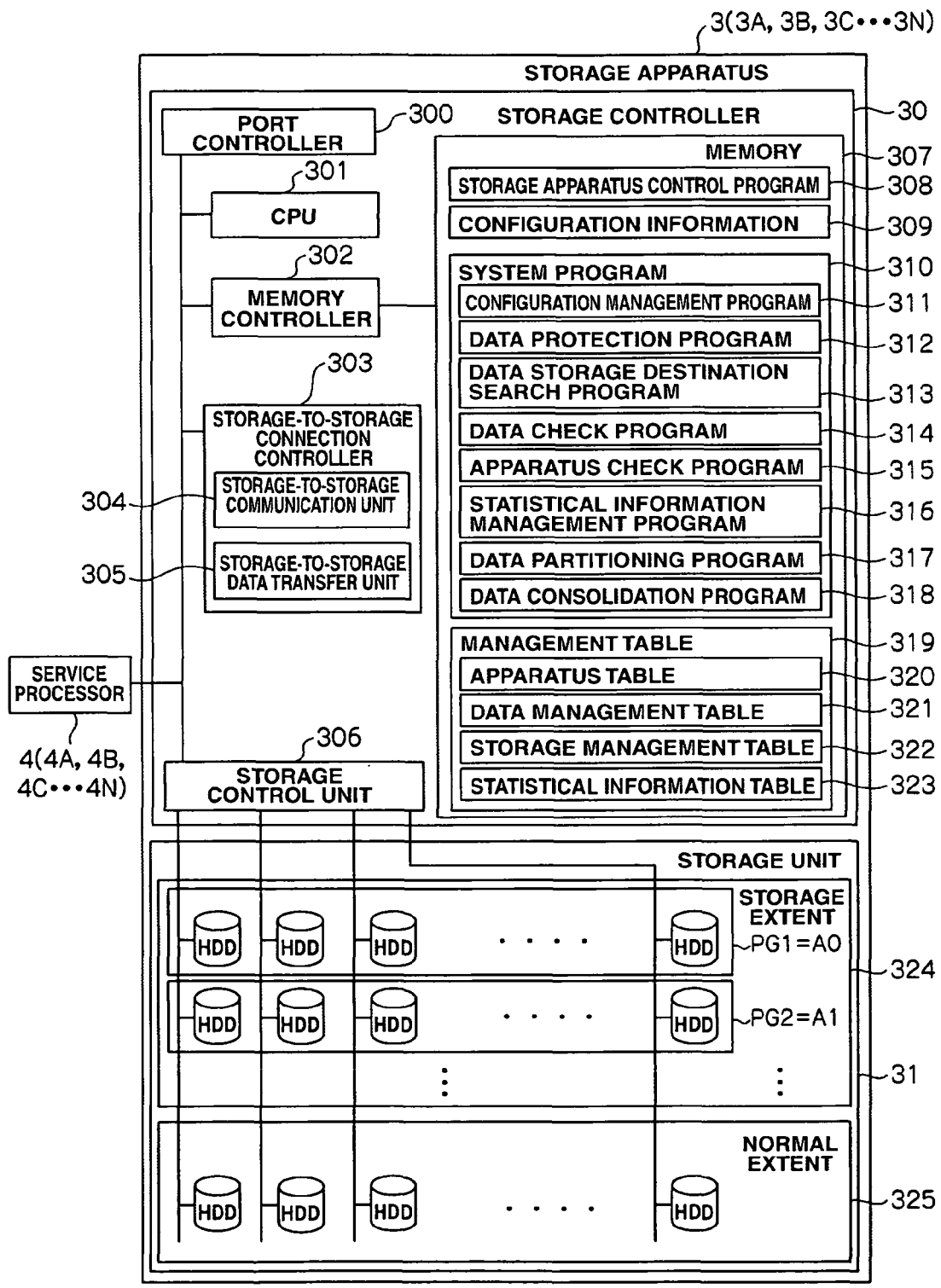
FIG. 2 is a block diagram showing the storage apparatus according to an embodiment of the present invention.

The storage apparatus 3, as shown in FIG. 2, comprises a storage controller 30 for controlling the storage apparatus 3, and a storage unit 31 for storing the write data or read data requested from the host system 2.

The storage controller 30 comprises a port controller 300, a CPU 301, a memory controller 302, a storage-to-storage connection controller 303, and a storage control unit 306.

The port controller 300 is a controller for controlling the input and output of data with a port (not shown) to and from the network 5. A port is given a network address such as a WWN (World Wide Name) or IP (Internet Protocol) address.

The CPU 301 is a processor for governing the control of the overall operation of the storage apparatus 3, and performs the various processes according to the system program 310 and the management table 319 stored in the memory 307.

The memory controller 302 is a controller for controlling the system program 310 and the management table 319 stored in the memory 307. The system program 310 and the management table 319 will be described in detail later.

The storage-to-storage connection controller 303 is a controller for controlling the communication among the plurality of storage apparatuses 3 connected via the network 5. The storage-to-storage connection controller 303 comprises a storage-to-storage communication unit 304 for communicating apparatus management information such as the unused capacity and operating status among the storage apparatuses 3, and a storage-to-storage data transfer unit 305 for controlling the communication of data in order to transfer data stored in the storage apparatus to another storage apparatus.

The storage control unit 306 is a controller for controlling a storage extent 324 of data stored in the storage unit 31.

The storage unit 31 comprises a storage extent 324 for storing data that needs to be stored for an extended period of time, and a normal extent 325 for storing normal data that does not need to be stored for an extended period of time. Data is stored in the storage extent 324 and the normal extent 325 in hard disk drive HDD units.

(2) Configuration of Management Table in Present Embodiment

The management table 319 stored in the memory 307 of the storage controller 30 according to the present embodiment is now explained.

Incidentally, with the storage system 1 shown in FIG. 1, for the sake of convenience, the primary storage apparatus is depicted as the storage apparatus 3A, and the secondary storage apparatus is depicted as other storage apparatuses 3B to 3N, but the present invention is not limited to this example.

The storage system 1 is characterized in that the primary storage apparatus 3A searches the secondary storage apparatuses 3B to 3N so that it can flexibly store data in at least two or more storage apparatuses as the storage destination, respectively creates primary-side authentic information and secondary-side authentic information showing that the data and redundant data are the same data in the primary storage apparatus 3A and the secondary storage apparatus 3B to 3N, and is able to store the same data in the respective storage extents 324 of the primary storage apparatus 3A and the secondary storage apparatus 3B to 3N when the primary-side authentic information and the secondary-side authentic information coincide.

As a means for the achieving the above, the management table 319 stores an apparatus table 320, a data management table 321, a storage management table 322, and a statistical information table 323.

(2-1) Apparatus Table

The apparatus table 320 is a table for the primary storage apparatus 3A to delink the management information of data stored in the secondary storage apparatus 3B to 3N from the apparatus table of the secondary storage apparatus 3B to 3N, and individually manage all storage apparatuses 3. As shown in FIG. 3, the apparatus table 320 is configured from an "apparatus ID" field 320A, and an "individual identification ID" field 320B.

The "apparatus ID" field 320A stores apparatus IDs for identifying all storage apparatuses 3 in the primary storage apparatus 3A. Further, the "individual identification ID" field 320B stores individual identification IDs corresponding to serial numbers for specifying all storage apparatuses 3.

Thus, for instance, as shown in FIG. 3, the individual identification ID of a storage apparatus having an "apparatus ID" of "S0" is "xx-xx-xx-xx-xx-xA".

(2-2) Data Management Table

The data management table 321 is a table for managing storage information used in managing data required to be stored for an extended period of time with the primary storage apparatus 3A, and storage information used in managing redundant data with the secondary storage apparatuses 3B to 3N. As shown in FIG. 4, the data management table 321 is configured from a "data ID" field 321A, a "storage area" field 321B, a "redundant destination storage area" field 321C, a "data creation date" field 321D, and a "final check date" field 321E.

Foremost, the "data ID" field 321A stores data IDs for identifying data stored in the primary disk device 3A.

The "storage area" field 321B stores storage destination information of the storage extent 324 in the storage unit 31. Further, the "storage area" field 321B is configured from a "parity group" field 321F, a "top address " field 321G, and a "data length" field 321H.

The "parity group" field 321F stores the names of the parity group configured for storing a single data by partitioning it into a plurality of hard disk drives HDD, and shows which parity the data is being stored. The "top address" field 321G stores the top address of the data to be stored, and the "data length" field 321H stores the length of the data to be stored.

The "redundant destination storage area" field 321C stores information for managing the redundant destination of data stored in the primary storage apparatus 3A. The "redundant destination storage area" field 321C is configured from an "apparatus ID" field 321I, and a "data ID" field 321J. The "apparatus ID" field 321I stores apparatus IDs of the secondary storage apparatus 3B to 3N of the redundant destination individually managed by the primary storage apparatus 3A, and the "data ID" field 321J stores data IDs of the redundant data.

The "data creation date" field 321D stores the year, month and day the data was created. The "final check date" field 321E stores the final day in which the data was confirmed.

For example, as shown in FIG. 4, the "parity group" of the "parity group" field 321F of data, which has identifying information where the "data ID" is "D0", is "PG1", the "top address" is "X0000", and the "data length" is "1024". The secondary storage apparatuses 3B to 3N storing the redundant data "D0" as the same data as the foregoing data are named "S1" in the primary storage apparatus 3A, and shows that they are managed in the data management table 321 of the primary storage apparatus 3A. The data creation date of the data "D0" is "Jan. 1, 2006", and the final day in which this data was confirmed is "Feb. 2, 2006".

(2-3) Correlation of Apparatus Table and Data Management Table

How the two tables and the plurality of storage apparatuses described above are correlated and managed is now explained.

Figure 5:
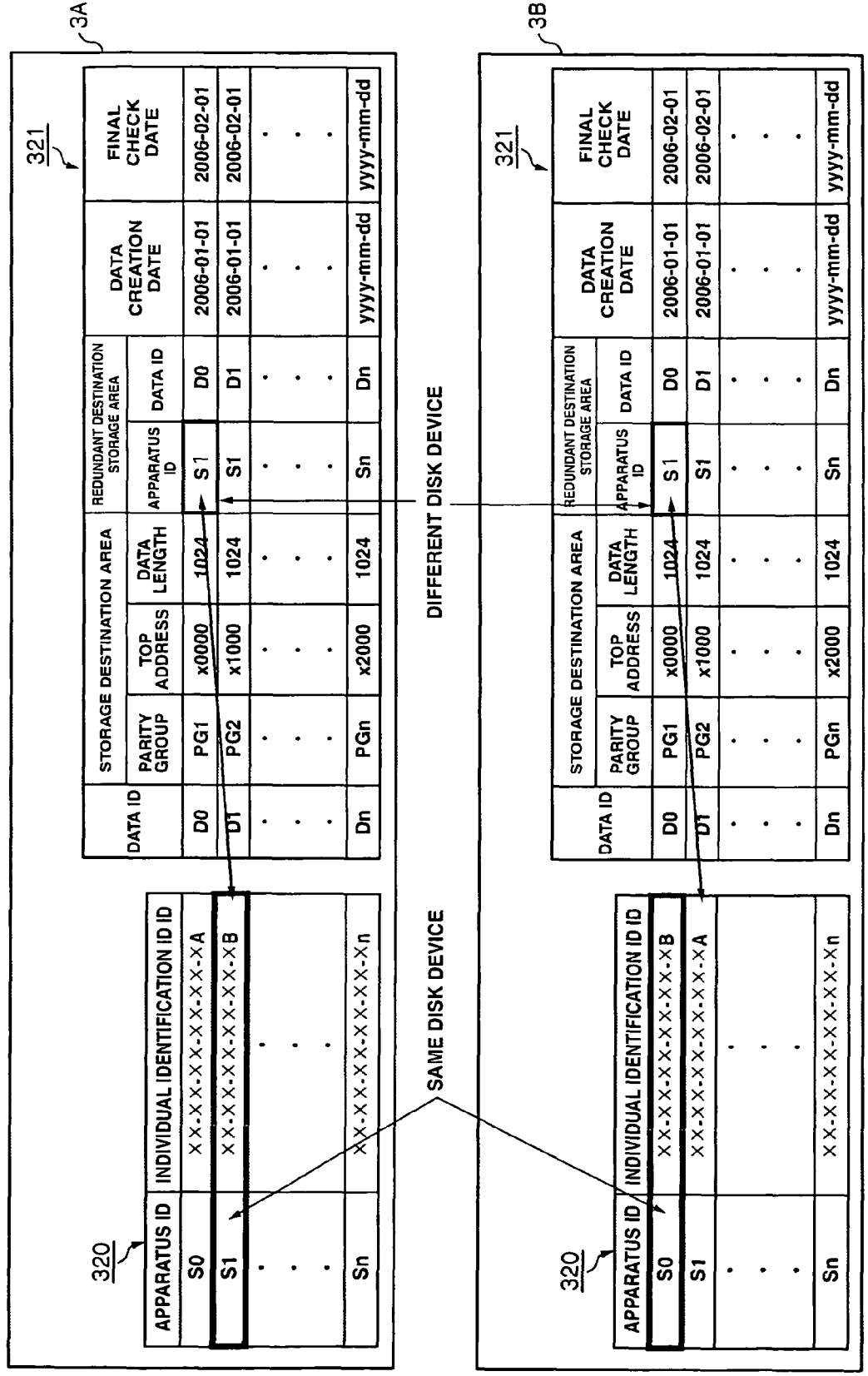
FIG. 5 is a mutual coordinated diagram of the apparatus table and the data management table of the respective storage apparatuses.

FIG. 5 shows the correlation between the apparatus table 320 and the data management table 321 managed in the primary storage apparatus 3A, and between the apparatus table 320 and the data management table 321 managed in the secondary storage apparatus 3B.

Foremost, the correlation between the apparatus table 320 and the data management table 321 of the primary storage apparatus 3A is explained. When focusing attention on a certain storage apparatus having an "individual identification ID" of "xx-xx-xx-xx-xx-xB", this storage apparatus has an "apparatus ID" named "S1". Similarly, with respect to the correlation between the apparatus table 320 and the data management table 321 of the secondary storage apparatus 3B, when focusing attention on a certain storage apparatus having an "individual identification ID" of "xx-xx-xx-xx-xx-xA", this storage apparatus has an "apparatus ID" named "S1".

The correlation between the apparatus table 320 of the primary storage apparatus 3A and the apparatus table 320 of the secondary storage apparatus 3B is now explained.

Foremost, an ID having a common individual identification ID shows that it is the same storage apparatus. Thus, for instance, when focusing attention on a certain storage apparatus having an "individual identification ID" of "xx-xx-xx-xx-xx-xB", with the apparatus table 320 of the primary storage apparatus 3A, the storage apparatus having this ID is managed with the "apparatus ID" named "S1". With the apparatus table 320 of the secondary storage apparatus 3B, the storage apparatus having this ID is managed with the "apparatus ID" named "S0".

As described above, it is evident that the respective storage apparatuses have a common individual identification ID in the respective storage apparatuses, and are naming and managing an independent apparatus ID corresponding to the individual identification ID. Therefore, even if the respective storage apparatuses have the same apparatus ID in the respective tables, so as long as the individual identification ID is different, this shows that these are different storage apparatuses. For example, the "apparatus ID" of "S1" of the apparatus table 320 of the primary storage apparatus 3A and the "apparatus ID" of "S1" of the apparatus table 320 of the secondary storage apparatus 3B show that they are different apparatuses.

Like this, since it is possible to manage all storage apparatuses independently from the secondary apparatuses in the primary storage apparatus 3A, even when the storage apparatus 3 is added or deleted, this configuration facilitates any change to the system.

(2-4) Storage Management Table

The storage management table 322 is a table for managing the storage extent 324 of the storage unit 31, and, as shown in FIG. 6, is configured from an "area ID" field 322A, and a "storage area" field 322B.

The "area ID" field 322A stores the storage extent ID of the storage unit 31, and the "storage area" field 322B stores the storage information of the storage extent 324 of the storage unit 31. The "storage area" field 322B is further configured from a "parity group" field 322C, a "total capacity" field 322D, and an "unused capacity" field 322D.

Explanation of the "parity group" field 322C is omitted since it was explained with reference to the data management table 321 described above. The "total capacity" field 322D stores total capacity information capable of storing data in a designated area of the storage extent 324, and the "unused capacity" field 322E stores unused capacity information of a designated area in a storage extent 324.

For instance, as shown in FIG. 2, the "area ID" of a storage extent, in which the "parity group" in the storage extent 324 is "PG1", is "A0", the "total capacity" of this area is "300 GB", and the "unused capacity" is "250 GB".

(2-5) Statistical Information Table

The statistical information table 323 is a table for managing statistical information of the respective storage apparatuses. The statistical information table 323, as shown in FIG. 7, is configured from a "hard disk ID" field 323A, an "area ID" field 323B, an "error count" field 323C, a "start date of use" field 323D, and a "cumulative operating time" field 323E.

The "hard disk ID" field 323A stores the hard disk ID configuring the parity group. Explanation of the "area ID" field 323B is omitted since it was explained with reference to storage management table 322. The "error count" field 323C stores the number of errors that occurred in the area during the operation of the storage extent 324. The "start date of use" field 323D stores the start date of use of the storage extent 324 in the area. The "cumulative operating time" field stores the total hours of operating time of the storage extent 324 in the area.

For example, as shown in FIG. 7, the area "A0" in the storage extent 324 having a "hard disk ID" of "H0" has an "error count" of "0", the start date of use of the area is "Jan. 1, 2006", and the total operating time is "744 hours".

(3) System Processing in Present Embodiment

The system processing according to the present embodiment is now explained.

(3-1) Case of Adding Storage Apparatus (3-1-1) Configuration Management Processing Foremost, before explaining the data protection processing of the present invention, the processing routine of the existing storage apparatuses recognizing a new storage apparatus upon adding such new storage apparatus to the storage system 1 is explained. Incidentally, the new storage apparatus will be explained as the storage apparatus 3N, and the existing storage apparatuses will be explained as the storage apparatuses 3A to 3C.

Figure 8:
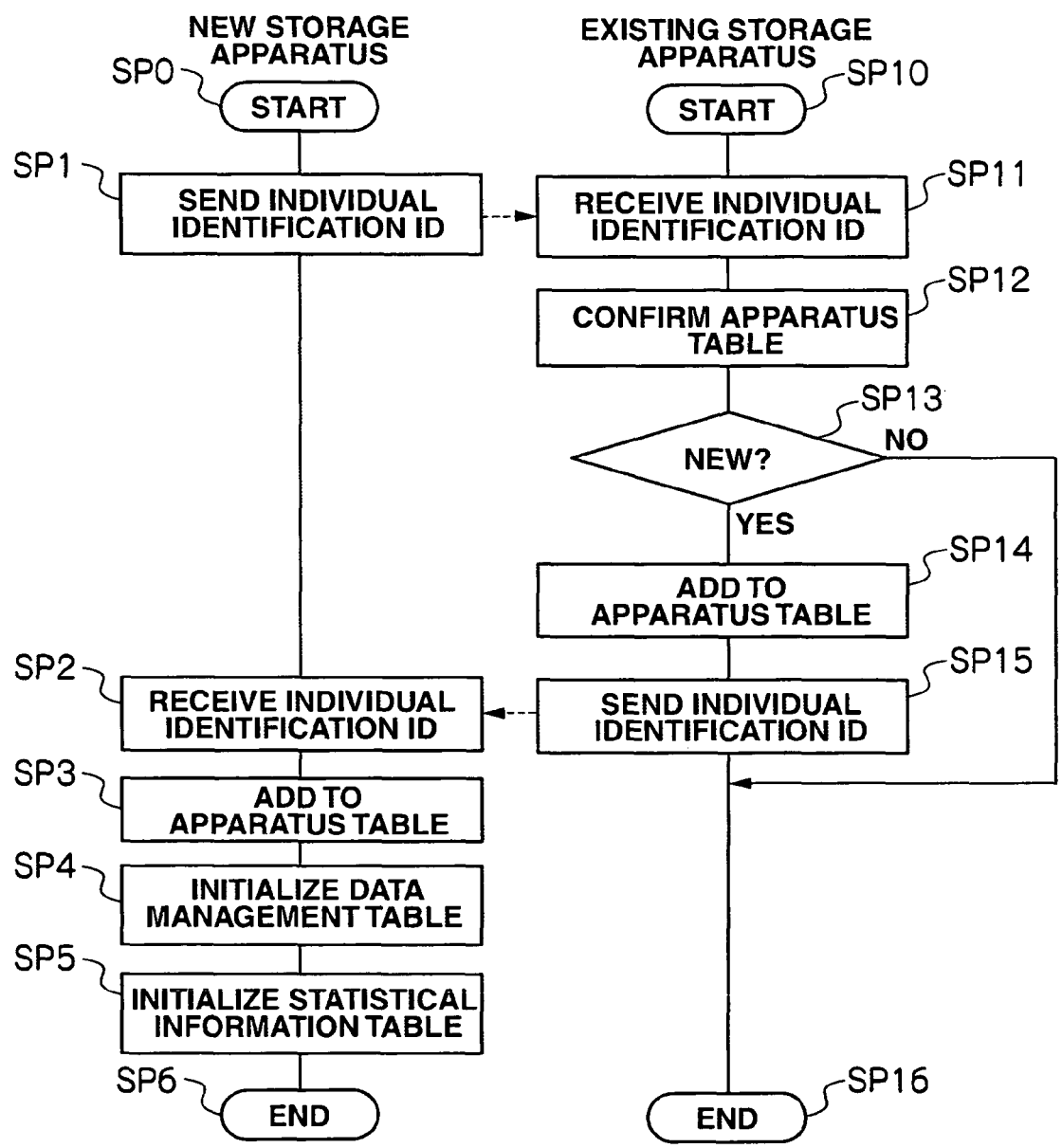
FIG. 8 is a flowchart showing the processing contents of the CPU of the storage apparatus relating to configuration management processing.

FIG. 8 is a flowchart showing the processing contents of the CPU 301 of the new storage apparatus 3N and the CPU 301 of the existing storage apparatuses 3A to 3C relating to the configuration management processing. The new storage CPU 301 and the existing storage CPU 301 respectively add management information of the new storage apparatus 3N to the existing storage apparatuses 3A to 3C by executing the configuration management processing based on the configuration management program 311 stored in the memory 307.

In other words, the CPU 301 of the new storage apparatus 3N starts the configuration management processing when newly established in the storage system 1 (SP0), and foremost sends the newly acquired individual identification ID to the existing storage apparatuses 3A to 3C (SP1). When the CPU 301 of the new storage apparatus 3N receives the individual identification ID from the existing storage apparatuses 3A to 3C to which the individual identification ID of the new storage apparatus 3N has been added (SP2), it adds the individual identification ID and the apparatus ID to the apparatus table 320 in the new storage apparatus 3N (SP3). The CPU 301 of the new storage apparatus 3N thereby initializes the data management table 321 in the new storage apparatus 3N (SP4), initializes the statistical information table 323 (SP5), and ends this processing (SP6).

Subsequently, the CPU 301 of the existing storage apparatuses 3A to 3N, as with step SP1 above, starts the processing when the new storage apparatus 3N is newly established in the storage system 1 (SP10). The CPU 301 of the existing storage apparatuses 3A to 3N receives the individual identification ID of the new storage apparatus 3N (SP11). The CPU 301 of the existing storage apparatuses 3A to 3N confirms the apparatus table 320 in the existing storage apparatuses 3A to 3N (SP12), and determines whether the individual identification ID is a new ID (SP13).

When the CPU 301 of the existing storage apparatus 3A to 3N determines that the individual identification ID is a new ID (SP13: YES), it adds the individual identification ID to the apparatus table 320 (SP14), sends the individual identification ID to the new storage apparatus 3N (SP15), and ends this processing (SP16). Meanwhile, when the CPU 301 of the existing storage apparatuses 3A to 3N determines that the individual identification ID is not a new ID (SP13: NO), it ends this configuration management information processing (SP16).

The storage system 1 is able to easily configure the new storage apparatus 3N based on this configuration management processing.

(3-2) Case of Storing Data for Extended Period of Time (3-2-1) Data Protection Processing Next, the processing routine for protecting data by storing data in at least two or more storage apparatuses as the storage destination in the storage system 1, and verifying the authenticity of data by creating authentic information of data is explained. Incidentally, with the storage system in FIG. 1, the primary storage apparatus is explained as the storage apparatus 3A and the secondary storage apparatus is explained as the storage apparatus 3B in the configuration management processing.

Figure 9:
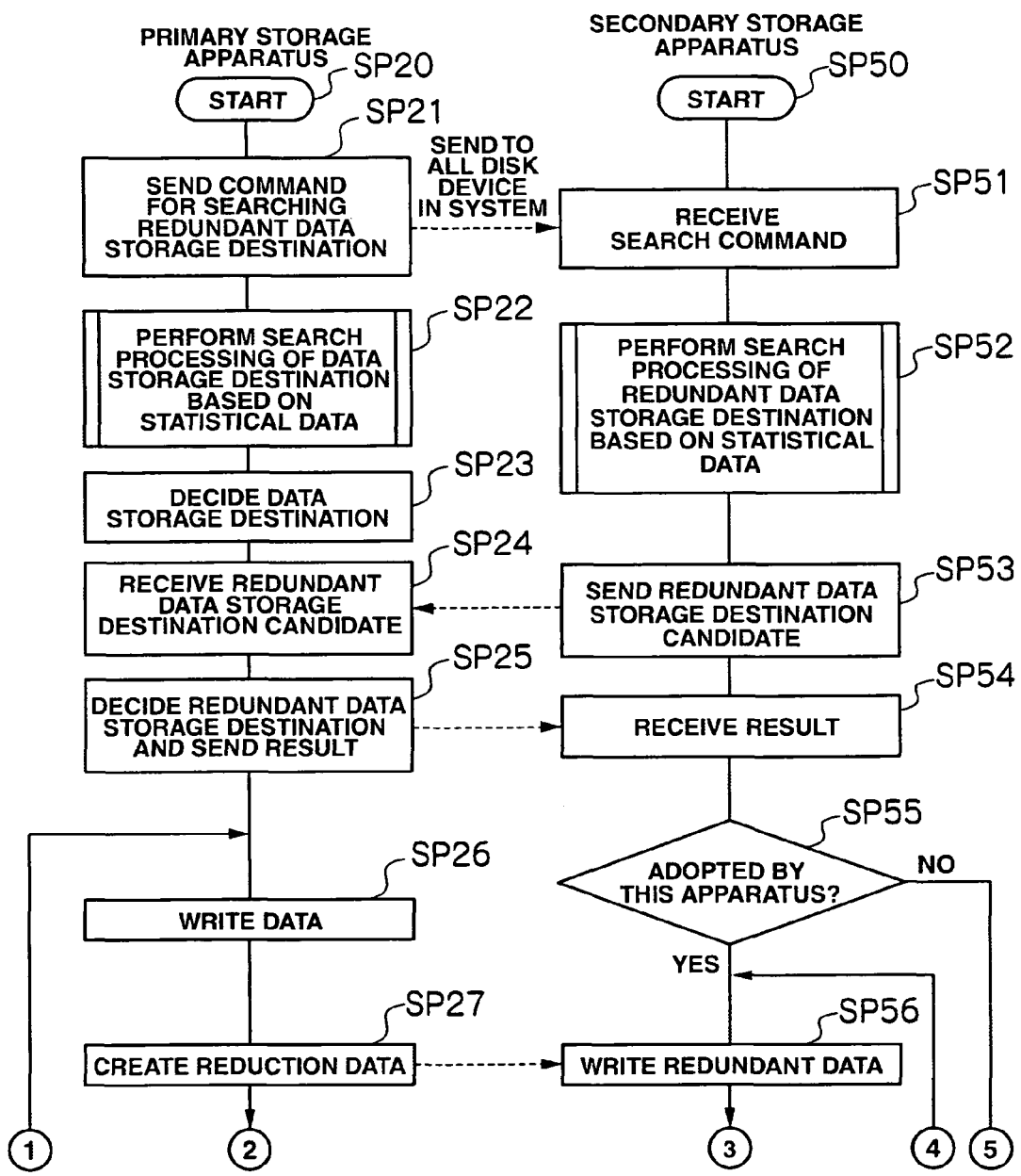
FIG. 9 is a flowchart showing the processing contents of the CPU of the storage apparatus relating to data protection processing.
Figure 10:
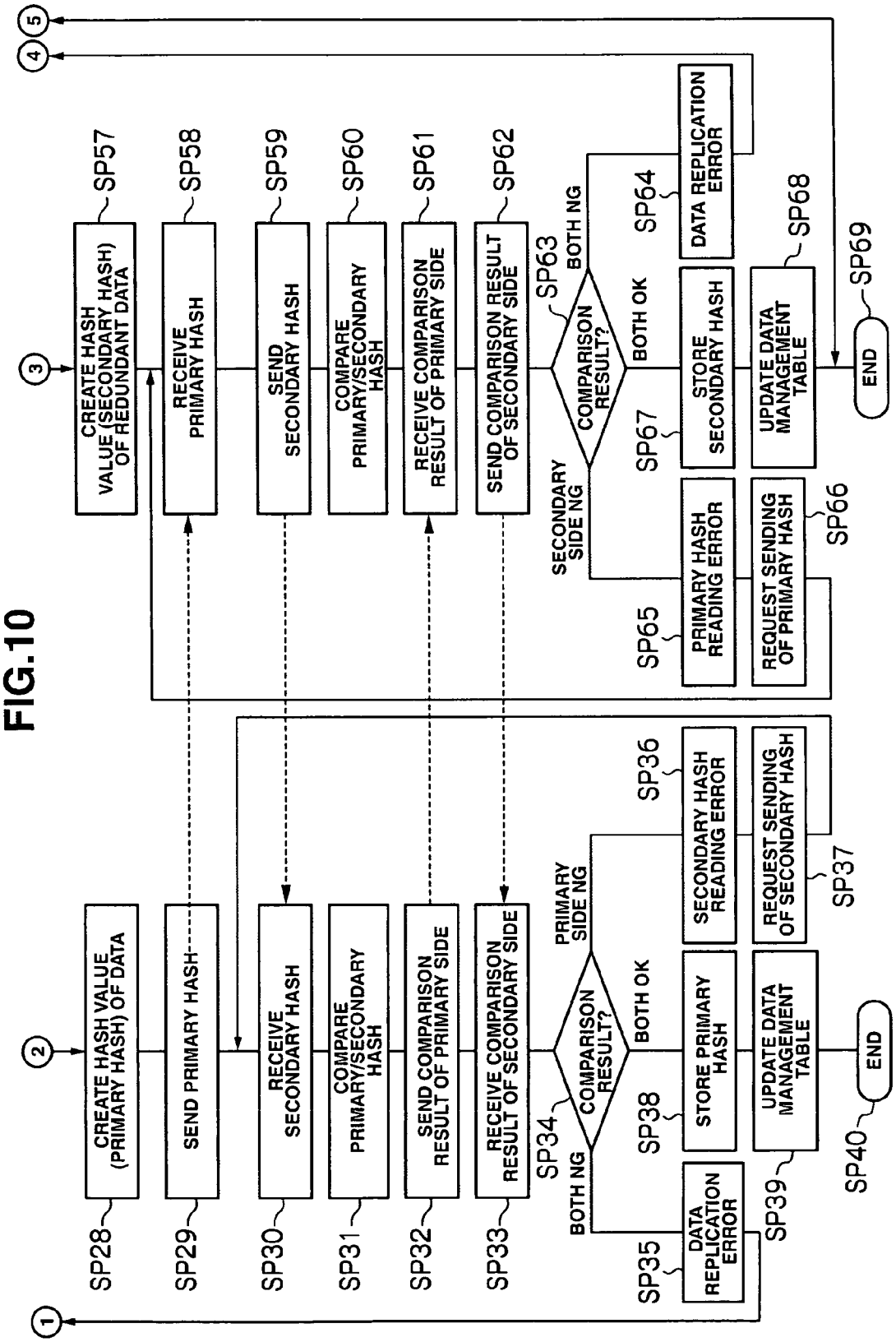
FIG. 10 is a flowchart showing the processing contents of the CPU of the storage apparatus relating to data protection processing.

FIG. 9 and FIG. 10 are flowcharts showing the processing contents of the CPU 301 of the primary storage apparatus 3A and the secondary storage apparatus 3B relating to the data protection processing. In this data protection processing, the CPU 301 of the primary storage apparatus 3A executes the data protection processing based on the data protection program 312 stored in the memory 307 of the primary storage apparatus 3A and stores data in the storage system 1. The same applies to the secondary storage apparatus 3B.

In other words, the CPU 301 of the primary storage apparatus 3A starts the data protection processing for writing data to be stored for an extended period of time in the storage extent 324 (SP20). The CPU 301 of the primary storage apparatus 3A sends a command for searching the storage destination to store redundant data to all storage apparatuses 3B to 3N in the storage system 1 excluding the primary storage apparatus 3A (SP21). Thereafter, the CPU 301 of the primary storage apparatus 3A executes search processing of the storage destination of data from the statistical information table 323 in the primary storage apparatus 3A (SP22). Contents regarding the detailed execution of this search processing will be explained later with reference to the flowchart illustrated in FIG. 11.

The CPU 301 of the primary storage apparatus 3A thereby decides the storage destination of data (SP23), and receives the redundant data storage destination candidate from the secondary storage apparatus 3B (SP24). The CPU 301 of the primary storage apparatus 3A decides the redundant data storage destination and sends the result thereof to the secondary storage apparatus 3B (SP25). Thereafter, the CPU 301 of the primary storage apparatus 3A writes the data to be stored in the storage extent 324 in the primary storage apparatus 3A (SP26), and creates redundant data (SP27). Redundancy of data is performed with the foregoing steps.

Subsequently, the CPU 301 of the primary storage apparatus 3A creates a hash value of data (hereinafter referred to as a "primary hash") (SP28). A primary hash is authentic information created for verifying the authenticity of data. The CPU 301 of the primary storage apparatus 3A sends the primary hash to the secondary storage apparatus 3B (SP29).

When the CPU 301 of the primary storage apparatus 3A similarly receives a hash value of redundant data (hereinafter referred to as a "secondary hash") created by the secondary storage apparatus 3B (SP30), it compares the primary hash and the secondary hash (SP31).

The CPU 301 of the primary storage apparatus 3A sends the primary comparison result compared with the primary storage apparatus 3A to the secondary storage apparatus 3B (SP32). When the CPU 301 of the primary storage apparatus 3A similarly receives the secondary comparison result compared with the secondary storage apparatus 3B (SP33), it determines the two comparison results (SP34).

When the CPU 301 of the primary storage apparatus 3A determines that the comparison result of the primary hash and the secondary hash is erroneous (SP34: both NG), it determines this to be a data replication error (SP35), returns to step SP26, and executes the subsequent processing.

When the CPU 301 of the primary storage apparatus 3A determines that only the comparison result of the primary storage apparatus 3A is erroneous (SP34: primary side NG), it recognizes this as a secondary hash reading error (SP36), requests the secondary storage apparatus 3B to send the secondary hash (SP37), thereafter returns to step SP30, and executes the subsequent processing.

Contrarily, when the CPU 301 of the primary storage apparatus 3A determines that the comparison result of the primary hash and the secondary hash is correct (SP34: both OK), it stores the primary hash (SP38), updates the data management table 321 (SP39), and thereafter ends the data protection processing with the primary storage apparatus 3A (SP40).

Meanwhile, the CPU 301 of the secondary storage apparatus 3B starts the data protection processing for writing data to be stored for an extended period of time in the primary storage apparatus 3A (SP50). The CPU 301 of the secondary storage apparatus 3B foremost receives a command for searching the storage destination to store redundant data from the primary storage apparatus 3A (SP51). Thereafter, the CPU 301 of the secondary storage apparatus 3B executes search processing of the storage destination of redundant data from the statistical information table 323 in the primary storage apparatus 3A (SP52). Contents regarding the detailed execution of this search processing will be explained later with reference to the flowchart illustrated in FIG. 11.

The CPU 301 of the secondary storage apparatus 3B thereby searches the redundant data storage destination candidate, and sends the candidate to the primary storage apparatus 3A (SP53). The CPU 301 of the secondary storage apparatus 3B receives from the primary storage apparatus 3A the result decided by the primary storage apparatus 3A as the redundant data storage destination based on the candidate (SP54). The CPU 301 of the secondary storage apparatus 3B thereby determines whether one's own storage apparatus was adopted as the secondary storage apparatus of the redundant destination of the primary storage apparatus 3A (SP55).

When the CPU 301 of the secondary storage apparatus 3B determines that it has not been adopted as the secondary storage apparatus of the redundant destination of the primary storage apparatus 3A (SP55: NO), it ends the data protection processing with the secondary storage apparatus 3B (SP69).

Meanwhile, when the CPU 301 of the secondary storage apparatus 3B determines that it has been adopted as the secondary storage apparatus of the redundant destination of the primary storage apparatus 3A (SP55: YES), it writes the redundant data in the storage extent 324 in the secondary storage apparatus 3B (SP56). Redundancy of data is performed with the foregoing steps.

Subsequently, the CPU 301 of the secondary storage apparatus 3B creates a hash value of redundant data (hereinafter referred to as a "secondary hash") (SP57). A secondary hash is authentic information created for verifying the authenticity of redundant data. The CPU 301 of the secondary storage apparatus 3B receives a primary hash from the primary storage apparatus 3A (SP58), and sends the created secondary hash to the primary storage apparatus 3A (SP59).

The CPU 301 of the secondary storage apparatus 3B compares the primary hash and the secondary hash (SP60), and receives the primary comparison result compared with the primary storage apparatus 3B from the primary storage apparatus 3A (SP61). Thereafter, the CPU 301 of the secondary storage apparatus 3B sends the secondary comparison result compared with the secondary storage apparatus 3B to the primary storage apparatus 3A (SP62), and determines the two comparison results (SP63).

When the CPU 301 of the secondary storage apparatus 3B determines that the comparison result of the primary hash and the secondary hash is erroneous (SP63: both NG), it determines this to be a data replication error (SP64), returns to step SP56, and proceeds to the subsequent step.

When the CPU 301 of the secondary storage apparatus 3B determines that only the comparison result of the secondary storage apparatus 3B is erroneous (SP65: secondary side NG), it recognizes this as a primary hash reading error (SP65), requests the primary storage apparatus 3A to send the primary hash (SP66), thereafter returns to step SP58, and proceeds to the subsequent step.

When the CPU 301 of the secondary storage apparatus 3B determines that the comparison result of the primary hash and the secondary hash is correct (SP63: both OK), it stores the secondary hash (SP67), updates the data management table 321 (SP68), and thereafter ends the data protection processing with the secondary storage apparatus 3B (SP69).

(3-2-2) Data Storage Destination Search Processing

The processing routine for searching the storage apparatus to become the primary storage apparatus for storing data is now explained.

Figure 11:
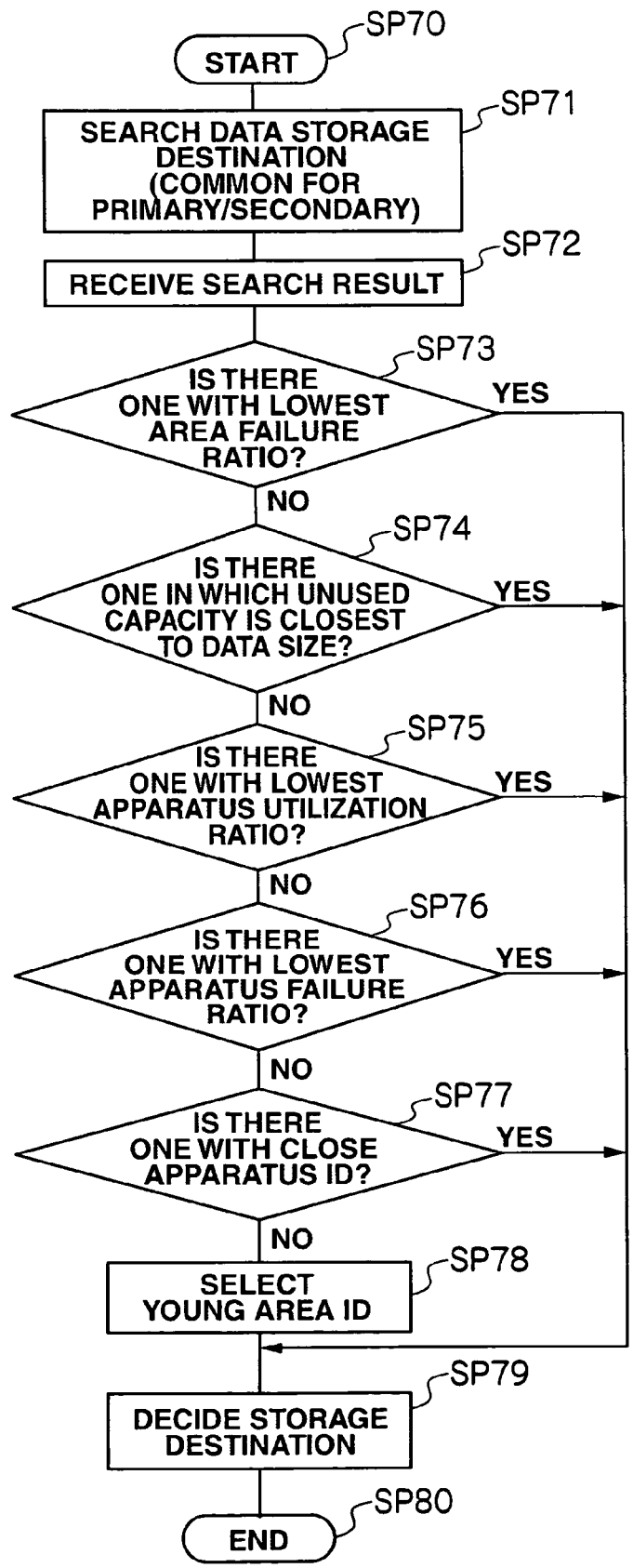
FIG. 11 is a flowchart showing the processing contents of the CPU of the storage apparatus relating to data storage destination search processing.

FIG. 11 is a flowchart showing the processing contents of the primary storage apparatus 3A relating to the data storage destination search processing. In this processing, data storage destination search processing is executed based on the data storage destination search program 313 stored in the memory 307 so as to search the primary storage apparatus for storing data.

In other words, the CPU 301 of the primary storage apparatus 3A starts the data storage destination search processing when the primary storage apparatus 3A sends a command for searching the redundant data storage destination to the secondary storage apparatus 3B (SP70).

Figure 12:
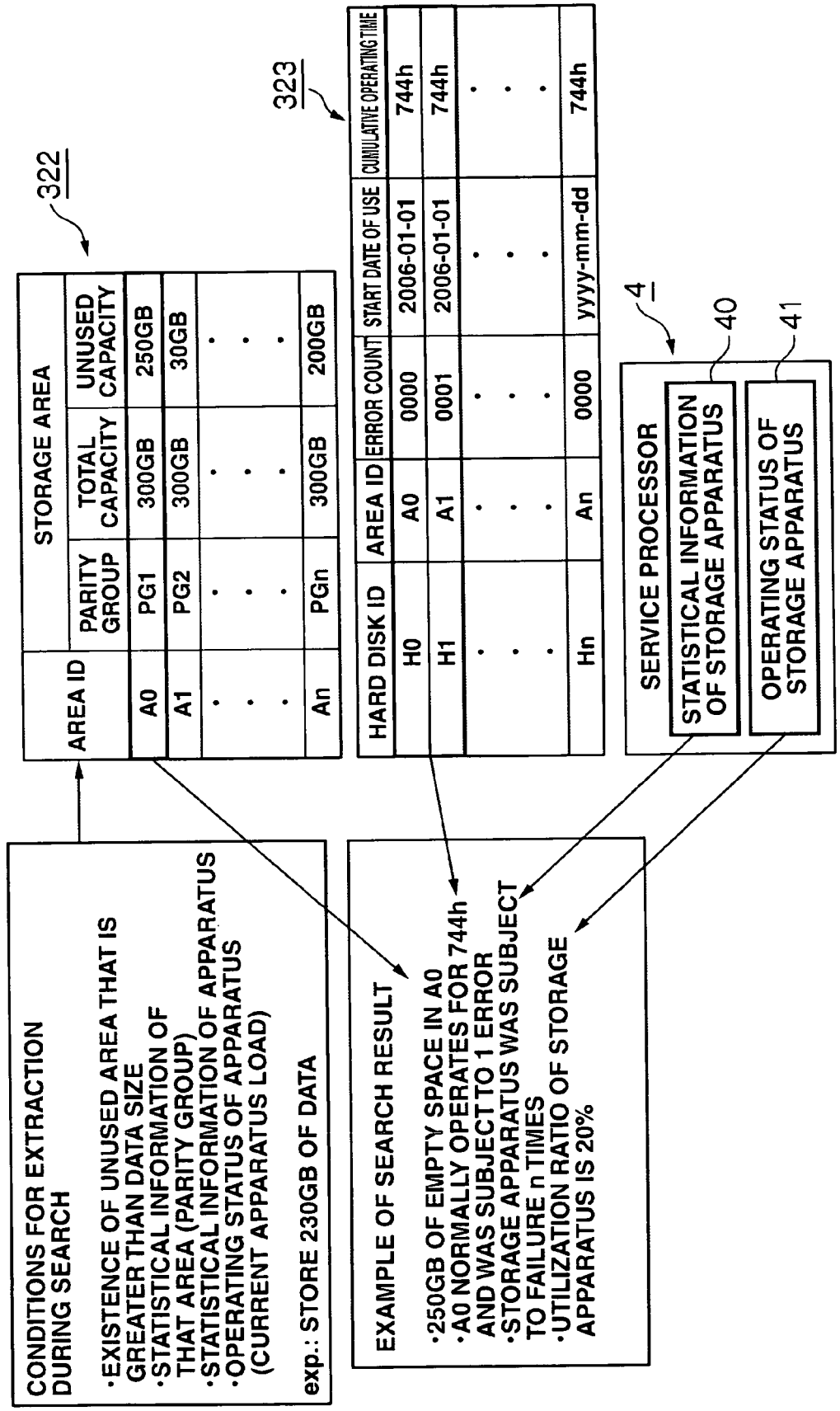
FIG. 12 is an explanatory diagram showing the processing contents of the CPU of the storage apparatus relating to data storage destination search processing.

Foremost, the CPU 301 of the primary storage apparatus 3A searches for the storage destination of data to be stored (SP71). For example, as shown in FIG. 12, in the case of storing 230 GB of data, the primary storage apparatus 3A refers to the storage management table 322 from the extraction conditions during the search. As such extraction conditions, there are unused capacity of data size or more, statistical information of the parity group, statistical information of apparatus, operating status of apparatus and so on.

The CPU 301 of the primary storage apparatus 3A receives the search results from all storage apparatuses 3B to 3N excluding the primary storage apparatus 3A (SP72). As shown in FIG. 12, for instance, the search results of the primary storage apparatus 3A, upon referring to the storage management table 322, show that the area having an "area ID" of "A0" has 250 GB of unused capacity. Further, when referring to the total information table 323, it shows that, in the primary storage apparatus 3A, the area having an "area ID" of "A0" has been operating for a total of 744 hours, and has an error count of 1. Moreover, the primary storage apparatus 3A shows the statistical information 40 of the storage apparatus subject to failure n times in the service processor 4, and an operating status 41 of the storage apparatus having a utilization ratio of 20%.

From the foregoing search results, the CPU 301 of the primary storage apparatus 3A determines whether there is a storage apparatus having a lowest area failure ratio (SP73). When the CPU 301 of the primary storage apparatus 3A determines that there is one primary storage apparatus corresponding to the foregoing determination (SP73: YES), it proceeds to step SP79.

Meanwhile, when the CPU 301 of the primary storage apparatus 3A determines that there are one or more primary storage apparatuses corresponding to the foregoing determination (SP73: NO), it determines whether there is a [storage apparatus] having an unused capacity that is closest to the data size (SP74).

When the CPU 301 of the primary storage apparatus 3A determines that there is one primary storage apparatus corresponding to the foregoing determination (SP74: YES), it proceeds to step SP79.

Meanwhile, when the CPU 301 of the primary storage apparatus 3A determines that there are one or more primary storage apparatuses corresponding to the foregoing determination (SP74: NO), it determines whether there is a storage apparatus having a lowest apparatus utilization ratio (SP75). When the CPU 301 of the primary storage apparatus 3A determines that there is one primary storage apparatus corresponding to the foregoing determination (SP75: YES), it proceeds to step SP79.

Meanwhile, when the CPU 301 of the primary storage apparatus 3A determines that there are one or more primary storage apparatuses corresponding to the foregoing determination (SP75: NO), it determines whether there is a storage apparatus having a lowest apparatus failure ratio (SP76). When the CPU 301 of the primary storage apparatus 3A determines that there is one primary storage apparatus corresponding to the foregoing determination (SP76: YES), it proceeds to step SP79.

Meanwhile, when the CPU 301 of the primary storage apparatus 3A determines that there are one or more primary storage apparatuses corresponding to the foregoing determination (SP76: NO), it determines whether there is a [storage apparatus] having a lowest apparatus ID (SP77). When the CPU 301 of the primary storage apparatus 3A determines that there is one primary storage apparatus corresponding to the foregoing determination (SP77: YES), it proceeds to step SP79.

Meanwhile, when the CPU 301 of the primary storage apparatus 3A determines that there are one or more primary storage apparatuses corresponding to the foregoing determination (SP77: NO), it selects the youngest area ID (SP78), i.e. selects the area ID with the smallest numerical value from among the plurality of area IDs, and narrows down the target storage apparatus to one storage apparatus.

When the primary storage apparatus is narrowed down to one and the storage destination is decided thereby (SP79), the data storage destination search processing is ended (SP80).

The CPU 301 of the primary storage apparatus 3A proceeds to step SP23 of FIG. 9, and thereafter executes the subsequent data protection processing.

Similarly, the data storage destination search processing of the secondary storage apparatus 3B is also executed according to the processing of step SP70 to step SP80. The CPU 301 of the secondary storage apparatus 3B proceeds to step SP53 of FIG. 9, and thereafter executes the subsequent data protection processing.

Like this, by searching the secondary storage apparatus so that the primary apparatus can flexibly store data in at least two or more storage apparatuses as the storage destination based on the data protection processing and data storage destination search processing, it is possible to respectively create primary-side authentic information or secondary-side authentic information showing that the data and redundant data are the same data in the primary storage apparatus or secondary storage apparatus, and store the same data in the respective storage extents of the primary storage apparatus and the secondary storage apparatus when the primary-side authentic information and the secondary-side authentic information coincide.

(3-3) Case of Checking Data Destruction
(3-3-1) Data Check Processing

The data check processing routine of the storage apparatus autonomously searching for the damaged data when the data stored in the storage apparatus is damaged and deleting the damaged data is now explained.

Incidentally, with the storage system 1 of FIG. 1, in the data check processing, the primary storage apparatus is illustrated as the storage apparatus 3A in which data is damaged, the secondary storage apparatus is illustrated as the storage apparatus 3B storing redundant data of the damaged data, and the new secondary storage apparatus is illustrated as the storage apparatus 3C for further storing the redundant data in a new storage apparatus. The CPU 301 of the respective storage apparatuses 3A to 3C executes the data check processing based on the data check program 314 stored in the memory 307.

Figure 13:
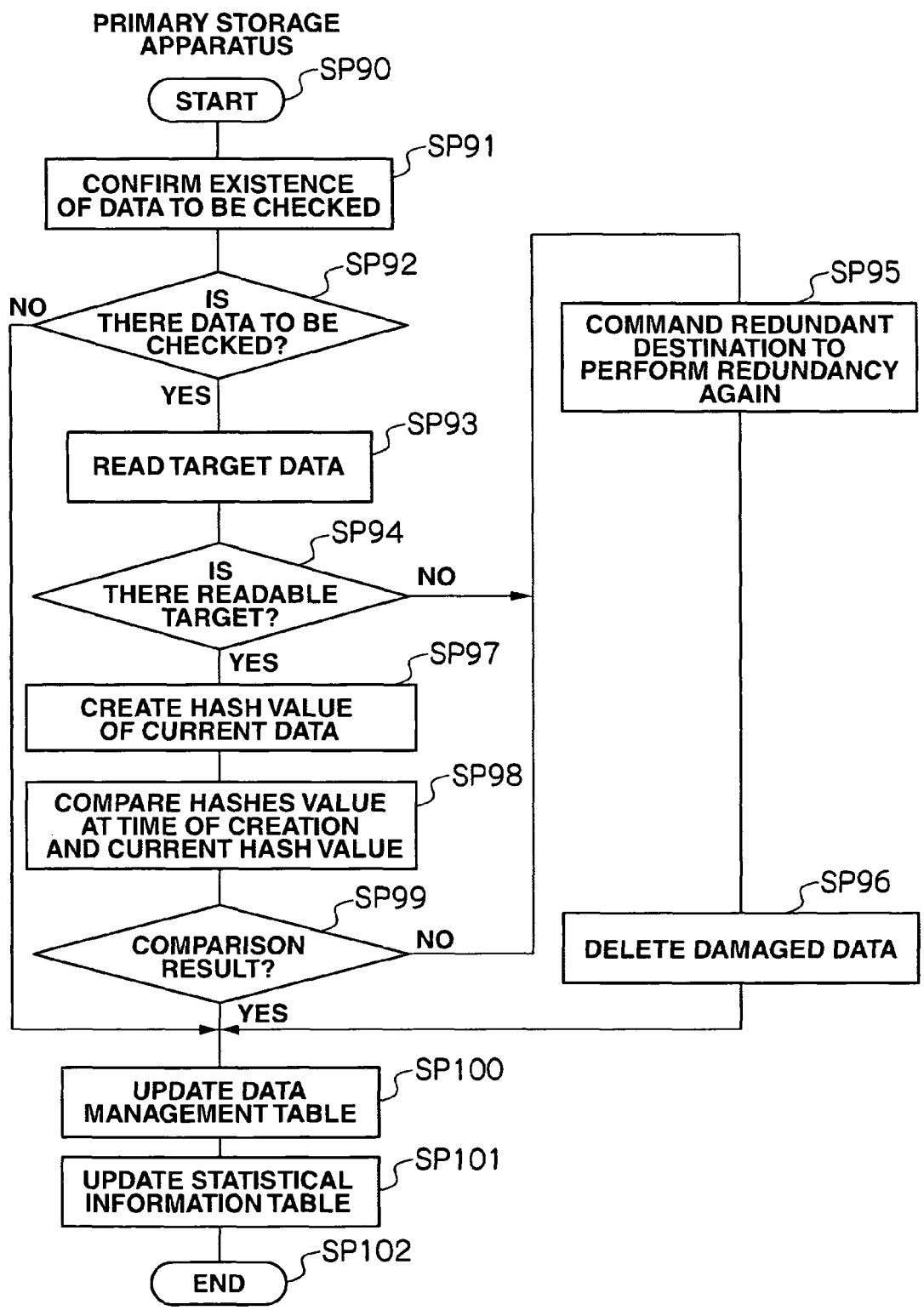
FIG. 13 is a flowchart showing the processing contents of the CPU of the storage apparatus relating to data check processing.

Foremost, FIG. 13 is a flowchart showing the processing contents of the CPU 301 of the primary storage apparatus 3A relating to the data check processing. In this processing, the processing routine of the primary storage apparatus 3 autonomously searching for the damaged data and deleting such damaged data is explained.

In other words, the CPU 301 of the primary storage apparatus 3A starts the data check processing by periodically checking the data (SP90). The CPU 301 of the primary storage apparatus 3A confirms the existence of damaged data to be checked (SP91). The CPU 301 of the primary storage apparatus 3A determines whether it is necessary to check the damaged data (SP92), and proceeds to step SP100 when it determines that there is no need to check the damaged data (SP92: NO).

Meanwhile, when the CPU 301 of the primary storage apparatus 3A determines that the damaged data needs to be checked (SP92: YES), it reads the damaged data to be checked (SP93). The CPU 301 of the primary storage apparatus 3A then determines whether the damaged data to be checked can be read (SP94).

When the CPU 301 of the primary storage apparatus 3A determines that the damaged data to be checked cannot be read (SP94: NO), it commands the secondary storage apparatus 3B to search for a new secondary storage apparatus 3C (SP95).

Figure 14:
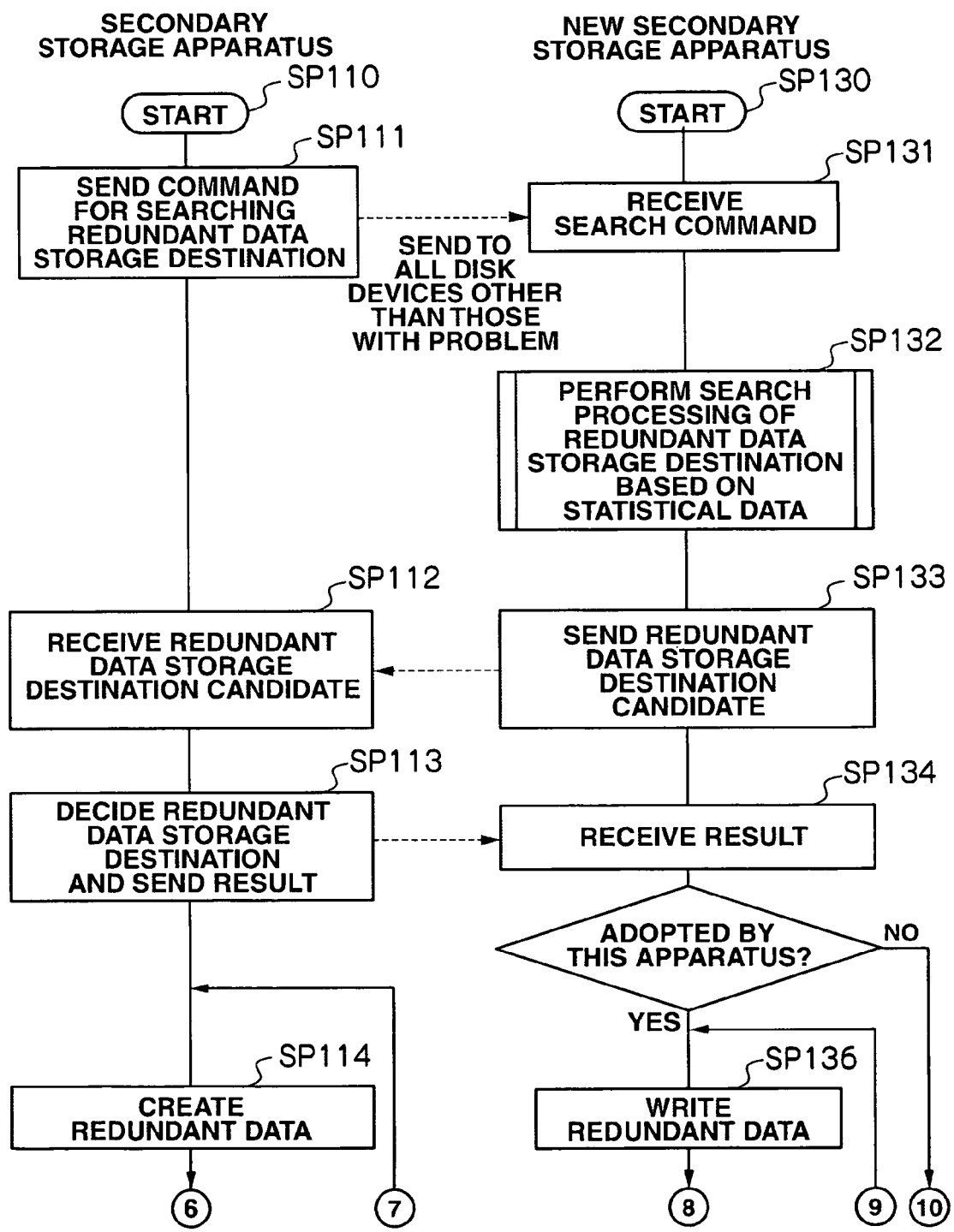
FIG. 14 is a flowchart showing the processing contents of the CPU of the storage apparatus relating to data check processing.

Here, in parallel with the foregoing processing, the secondary storage apparatus 3B executes the data protection processing shown in FIG. 14. Details regarding this processing will be explained later.

The CPU 301 of the primary storage apparatus 3A deletes the damaged data (SP96), and proceeds to step SP97.

Meanwhile, when the CPU 301 of the primary storage apparatus 3A determines that there is damaged data to be checked that can be read (SP94: YES), it creates a hash value of the current data (SP97). The CPU 301 of the primary storage apparatus 3A compares the hash value at the time the data was initially created and the hash value of the current data (SP98), and determines the comparison result (SP99).

When the CPU 301 of the primary storage apparatus 3A determines that the hash value upon creation and the current hash value do not coincide (SP99: NO), it performs the processing at step SP95 and step SP96, and thereafter proceeds to step sP100.

Meanwhile, when the CPU 301 of the primary storage apparatus 3A determines that the hash value upon creation and the current hash value coincide (SP99: YES), it updates the data management table 321 (SP100), updates the statistical information table 323 (SP101), and thereafter ends this data check processing (SP102).

Like this, when the primary storage apparatus is to autonomously search for damaged data and there is damaged data in the primary storage apparatus, it is possible to delete such damaged data.

(3-3-2) Data Protection Processing

When it is determined that the CPU 301 of the primary storage apparatus 3A is the storage apparatus in which the data is damaged based on the execution of the data check processing, the CPU 301 of the primary storage apparatus 3A commands all storage apparatuses 3B to 3N excluding the primary storage apparatus 3A to search for a pair-configured secondary storage apparatus. The searched secondary storage apparatus further searches for a new secondary storage apparatus, and executes the data protection processing for protecting the redundant data of the destroyed data. Incidentally, as with the data check processing, the explanation is provided with reference to the primary storage apparatus 3A, secondary storage apparatus 3B, and new secondary storage apparatus 3C.

Figure 15:
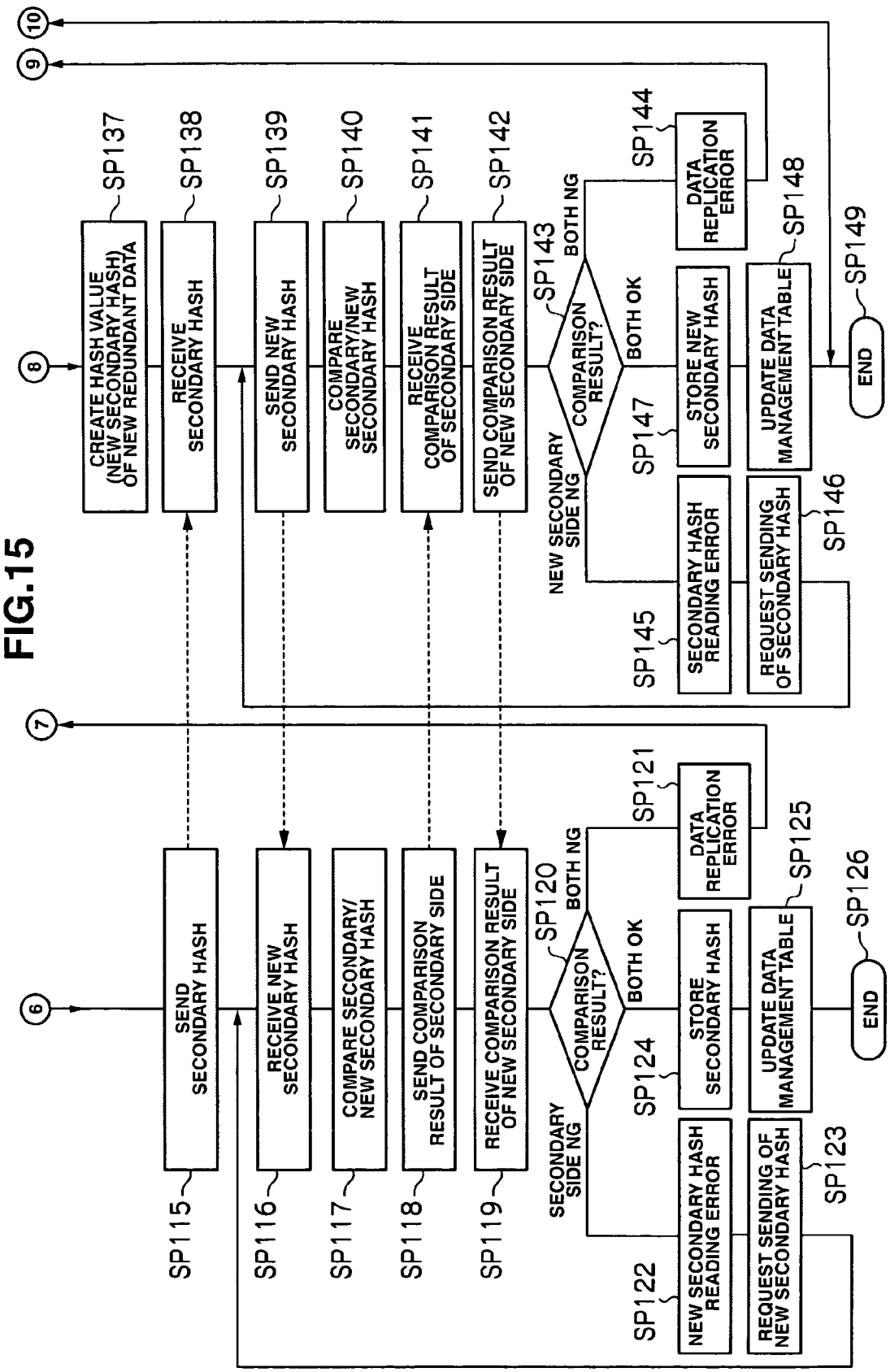
FIG. 15 is a flowchart showing the processing contents of the CPU of the storage apparatus relating to data check processing and data protection processing.

Specifically, FIG. 14 and FIG. 15 are flowcharts showing the processing contents of the secondary storage apparatus 3B and the new secondary storage apparatus 3C relating to the data protection processing after the execution of the data check processing.

In other words, the primary storage apparatus 3A starts the data protection processing by commanding all storage apparatuses 3B to 3N excluding the primary storage apparatus 3A to search for the pair-configured secondary storage apparatus 3B (SP110). Thereafter, the CPU 301 of the secondary storage apparatus 3B sends a command to all storage apparatuses 3C to 3N in the storage system 1 excluding the primary storage apparatus 3A for searching the storage destination to store redundant data (SP111).

When the CPU 301 of the secondary storage apparatus 3B receives the redundant data storage destination candidate from the new secondary storage apparatus 3C (SP112), it decides the redundant data storage destination, and sends the result thereof to the new secondary storage apparatus 3C (SP113). Thereafter, the secondary storage apparatus 3B creates redundant data (SP114).

The CPU 301 of the secondary storage apparatus 3B performs subsequent step SP115 to step SP126 as with the processing routine of step SP29 to step SP40 shown in FIG. 10.

The data protection processing of the new secondary storage apparatus 3C is now explained.

The CPU 301 of the primary storage apparatus 3A starts the data protection processing by issuing a command to all storage apparatuses 3B to 3N excluding the primary storage apparatus 3A to search for a pair-configured secondary storage apparatus (SP130). Thereafter, the CPU 301 of the secondary storage apparatus 3B performs subsequent step SP131 to step SP149 as with the processing routine of step SP51 to step SP69 shown in FIG. 9 and FIG. 10.

(3-4) Case of Checking Malfunction of Storage Apparatus
(3-4-1) Apparatus Check Processing The apparatus check processing routine for the storage apparatus to detect all storage apparatus excluding the malfunctioned storage apparatus when the storage apparatus itself malfunctions is now explained.

Incidentally, with the storage system 1 of FIG. 1, in the apparatus check processing, the primary storage apparatus is illustrated as the storage apparatus 3A which malfunctioned, the secondary storage apparatus is illustrated as the storage apparatus 3B storing the redundant data of the malfunctioned data, and the new secondary storage apparatus is illustrated as the storage apparatus 3C for further storing the redundant data in a new storage apparatus. The CPU 301 of the respective storage apparatuses 3A to 3C executes the apparatus check processing based on the apparatus check program 315.

Figure 16:
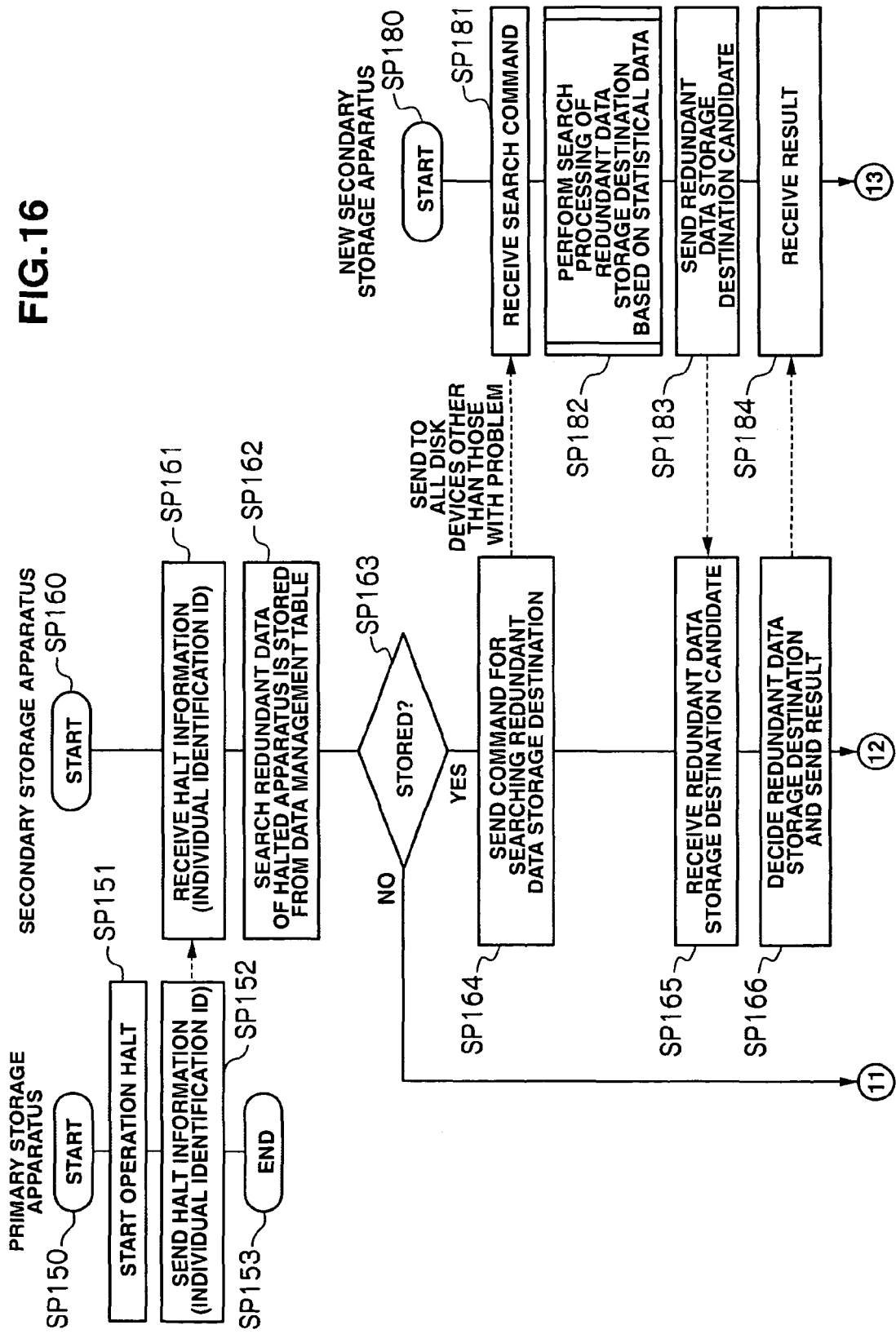
FIG. 16 is a flowchart showing the processing contents of the CPU of the storage apparatus relating to apparatus check processing.
Figure 17:
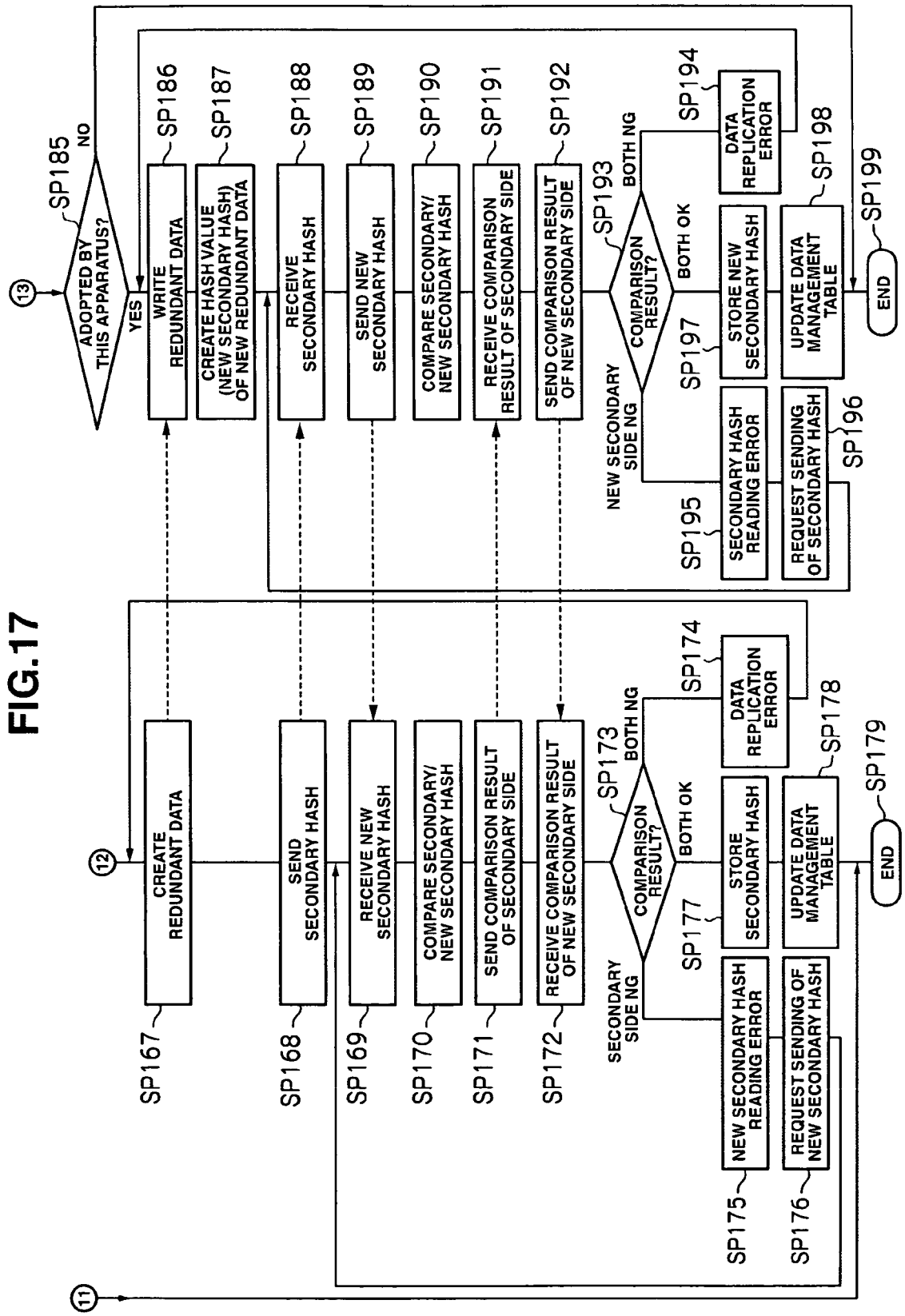
FIG. 17 is a flowchart showing the processing contents of the CPU of the storage apparatus relating to apparatus check processing and data protection processing.

Foremost, FIG. 16 and FIG. 17 show the processing contents of the CPU 301 of the primary storage apparatus 3A, secondary storage apparatus 3B, and new secondary storage apparatus 3C relating to the apparatus check processing. In this processing, foremost, the processing routine is explained where the primary storage apparatus 3A itself malfunctions and sends halt information, and the secondary storage apparatus 3B searches for the new secondary storage apparatus 3C is explained.

In other words, the CPU 301 of the primary storage apparatus 3A starts the apparatus check processing when the apparatus malfunctions (SP150). The CPU 301 of the primary storage apparatus 3A starts the operation halt in the apparatus (SP151), and sends the individual identification ID as the halt information to the secondary storage apparatus 3B (SP152). The apparatus check processing is thereafter ended (SP153).

Incidentally, when the primary storage apparatus 3A is malfunctioned to a degree where it is not able to send the individual identification ID, the secondary storage apparatus 3B will start the processing by detecting that there is no response from the primary storage apparatus 3A.

The apparatus check processing routine of the secondary storage apparatus 3B is now explained.

The CPU 301 of the secondary storage apparatus 3B starts the apparatus check processing when the primary storage apparatus 3A malfunctions (SP160).

When the CPU 301 of the secondary storage apparatus 3B receives the individual identification ID from the malfunctioned primary storage apparatus 3A (SP161), it searches whether the redundant data of the malfunctioned primary storage apparatus 3A is stored based on the data management table 321 (SP162).

Thereafter, the CPU 301 of the secondary storage apparatus 3B determines whether the redundant data is stored (SP163), and, when it determines that such redundant data is not stored (SP163: NO), ends this apparatus check processing routine (SP179).

Meanwhile, when the CPU 301 of the secondary storage apparatus 3B determines that the redundant data is stored (SP163: YES), it executes the data protection processing for storing the redundant data in the new secondary storage apparatus 3C.

(3-4-2) Data Protection Processing

In other words, the CPU 301 of the secondary storage apparatus 3B sends a command to all storage apparatuses 3C to 3N in the storage system 1 excluding the primary storage apparatus 3A to search for the storage destination to store the redundant data (SP164).

When the CPU 301 of the secondary storage apparatus 3B receives the redundant data storage destination candidate from the new secondary storage apparatus 3C (SP165), it decides the redundant data storage destination, and sends the result thereof to the new secondary storage apparatus 3C (SP166). Thereafter, the CPU 301 of the secondary storage apparatus 3B creates redundant data (SP167).

The CPU 301 of the secondary storage apparatus 3B sets the hash value of the redundant data as the secondary hash, and sets the hash value of the new redundant data created with the new secondary storage apparatus 3C as the new secondary hash, and thereafter performs step SP168 to step SP179 with a similar processing routine of step SP29 to step SP40 shown in FIG. 10.

The data protection processing of the new secondary storage apparatus 3C is now explained.

The CPU 301 of the new secondary storage apparatus 3C starts the data protection processing by the primary storage apparatus 3A sending a command to all storage apparatuses 3B to 3N excluding the primary storage apparatus 3A to search for the pair-configured secondary storage apparatus 3B (SP180).

The CPU 301 of the new secondary storage apparatus 3C sets the hash value of the redundant data created with the secondary storage apparatus 3B to be the secondary hash, sets the hash value of the new redundant data created with the new secondary storage apparatus 3C to be the new secondary hash, and thereafter performs step SP181 to step SP199 as with the processing routine of step SP51 to step SP69 shown in FIG. 9 and FIG. 10.

Like this, by the secondary storage apparatus executing the apparatus check processing and the data protection processing, it is possible to refer to the apparatus ID corresponding to the malfunctioned individual identification ID stored in the data management table in the secondary storage apparatus, and automatically store the redundant data having this apparatus ID in the searched new secondary storage apparatus.

Incidentally, although a case was explained where the storage apparatus malfunctioned, the apparatus check processing and the data protection processing will also be performed when systematically removing the storage apparatus.

(3-5) Case of Performing Preservative Maintenance to Storage Apparatus (3-5-1) Statistical Information Management Processing The statistical information management processing routine for the storage apparatus to detect data that could be lost due to data malfunction or apparatus malfunction due to the aging of the storage apparatus through prolonged years of use, and performing preventive measures to all storage apparatuses excluding the relevant storage apparatus before such data is lost is now explained.

Incidentally, with the storage system 1 of FIG. 1, in the statistical information management processing, the primary storage apparatus is illustrated as the storage apparatus 3A storing data that could be lost, the secondary storage apparatus is illustrated as the storage apparatus 3B storing redundant data of data that could be lost, and the new secondary storage apparatus is illustrated as the storage apparatus 3C for further storing the redundant data in a new storage apparatus. The CPU 301 of the respective storage apparatus 3A to 3C executes statistical information management processing based on the statistical information management program 316.

Figure 18:
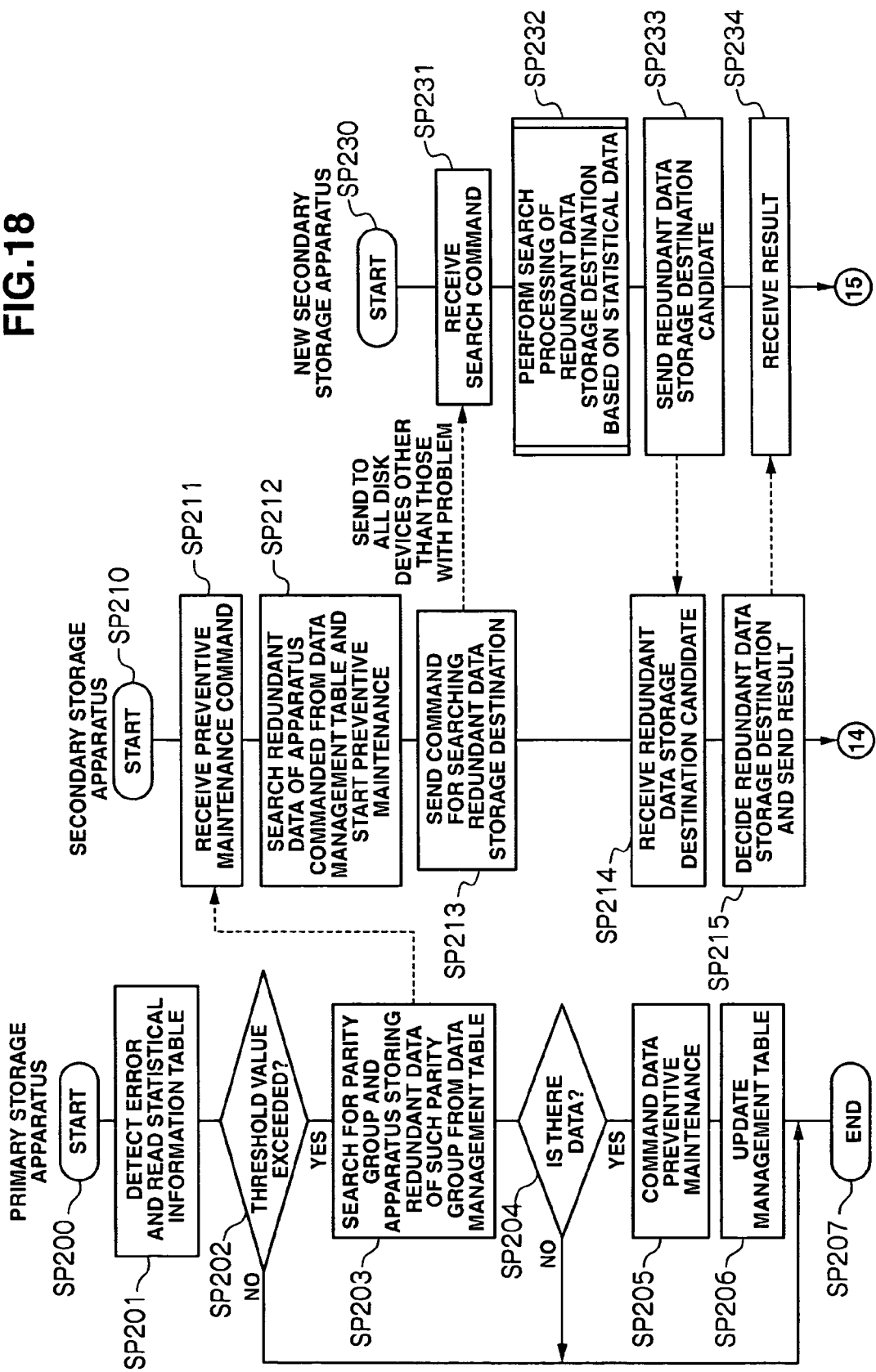
FIG. 18 is a flowchart showing the processing contents of the CPU of the storage apparatus relating to statistical information management processing.
Figure 19:
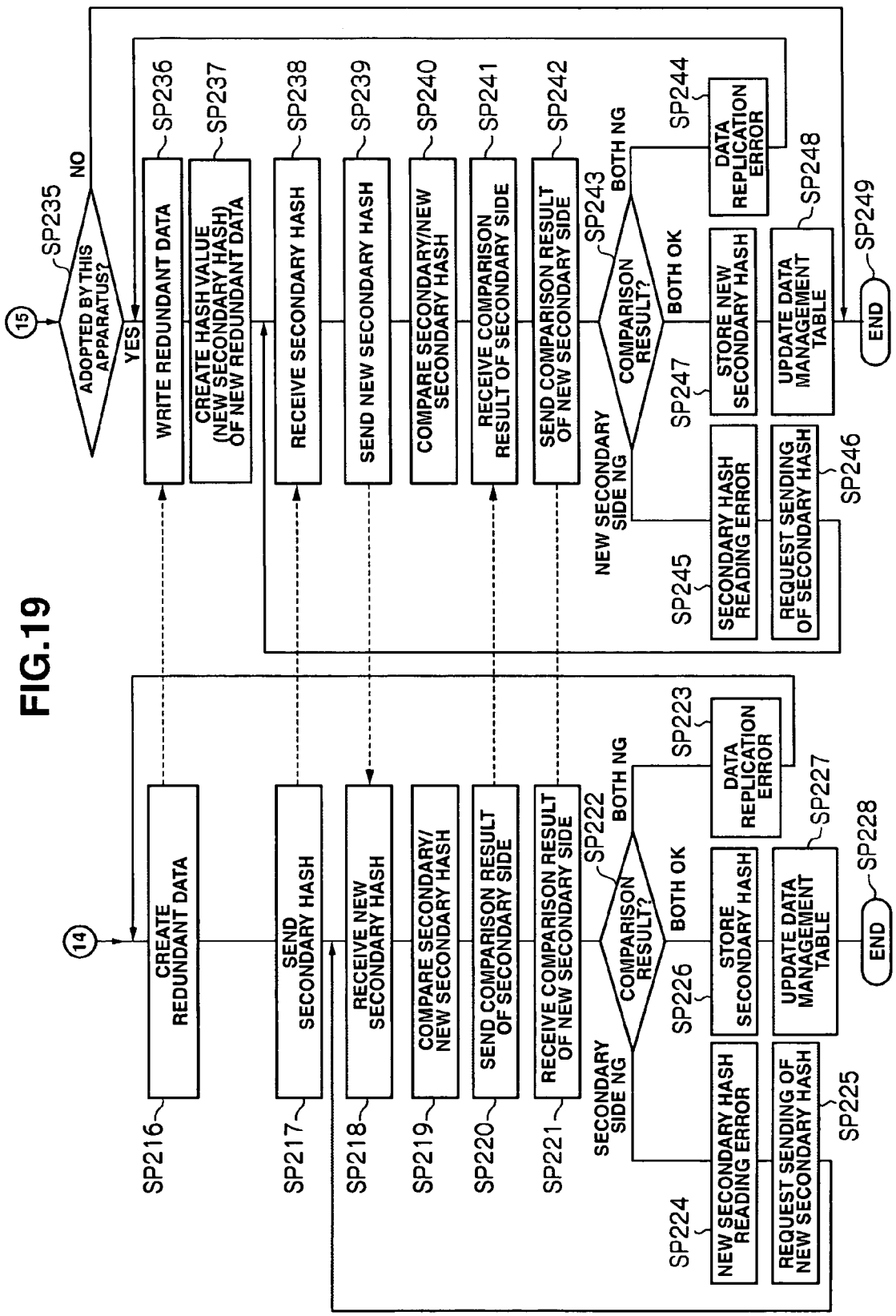
FIG. 19 is a flowchart showing the processing contents of the CPU of the storage apparatus relating to statistical information management processing and data protection processing.

Foremost, FIG. 18 and FIG. 19 show the processing contents of the CPU 301 of the primary storage apparatus 3A, secondary storage apparatus 3B, new secondary storage apparatus 3C relating to the statistical information management processing.

In other words, the CPU 301 of the primary storage apparatus 3A starts the statistical information management processing when statistical information such as the failure ratio of the storage apparatus or the replacement factor of the hard storage exceeds a predetermined threshold value (SP200).

The CPU 301 of the primary storage apparatus 3A detects an error and reads the statistical information table 323 (SP201), and determines whether the error count or operating time of the storage apparatus is exceeding a predetermined threshold value (SP202). When the CPU 301 of the primary storage apparatus 3A determines that the values are not exceeding the threshold value (SP202: NO), it ends the statistical information management processing (SP207).

Meanwhile, when the CPU 301 of the primary storage apparatus 3A determines that a value is exceeding the threshold value (SP202: YES), it refers to the data management table 321, and searches for the parity group as the area of the storage destination in data requiring preventive maintenance, and the storage apparatus storing redundant data as the redundant destination of data to be stored in the parity group (SP203).

The CPU 301 of the primary storage apparatus 3A determines whether it is necessary to store the redundant data (SP204), and, when it determines that it is not necessary to store the redundant data (SP204: NO), it ends the statistical information management processing (SP207).

Meanwhile, when the CPU 301 of the primary storage apparatus 3A determines that it is necessary to store the redundant data (SP204: YES), it commands the secondary storage apparatus 3B to perform preventive maintenance to the data (SP205), updates the data management table 321 (SP206), and thereafter ends the statistical information management processing (SP207).

The statistical information management processing in the secondary storage apparatus 3B is now explained.

In other words, the CPU 301 of the secondary storage apparatus 3B starts the statistical information management processing when the statistical information such as the failure ratio of the storage apparatus or the replacement factor of the hard storage of the primary storage apparatus 3A exceeds a predetermined threshold value (SP210).

When the CPU 301 of the secondary storage apparatus 3B receives a command to perform preventive maintenance from the primary storage apparatus 3A (SP211), it refers to the data management table 321 stored in the memory 307 of the secondary storage apparatus 3B, searches for the redundant data stored in the storage apparatus required the preventive maintenance command by the primary storage apparatus 3A, and starts the preventive maintenance (SP212). The CPU 301 of the secondary storage apparatus 3B thereby executes the data protection processing for storing the redundant data in the new secondary storage apparatus 3C.

(3-5-2) Data Protection Processing

In other words, the CPU 301 of the secondary storage apparatus 3B sends a command to all storage apparatuses 3C to 3N in the storage system 1 excluding the primary storage apparatus 3A to search for the storage destination to store the redundant data (SP213).

When the CPU 301 of the secondary storage apparatus 3B receives the redundant data storage destination candidate from the new secondary storage apparatus 3C (SP214), it decides the redundant data storage destination, and sends the result thereof to the new secondary storage apparatus 3C (SP215). Thereafter, the CPU 301 of the secondary storage apparatus 3B creates redundant data (SP216).

The CPU 301 of the secondary storage apparatus 3B sets the hash value of the redundant data created with the secondary storage apparatus 3B to be the secondary hash, sets the hash value of the new redundant data created with the new secondary storage apparatus 3C to be the new secondary hash, and thereafter performs step SP217 to step SP228 as with the processing routine of step SP29 to step SP40 shown in FIG. 10.

The data protection processing of the new secondary storage apparatus 3C is now explained.

The CPU 301 of the new secondary storage apparatus 3C starts the data protection processing by the primary storage apparatus 3A sending a command to all storage apparatuses 3B to 3N excluding the primary storage apparatus 3A to search for the pair-configured secondary storage apparatus 3B (SP230). Thereafter, the CPU 301 of the new secondary storage apparatus 3C sets the hash value of the redundant data created with the secondary storage apparatus 3B to be the secondary hash, sets the hash value of the new redundant data created with the new secondary storage apparatus 3C to be the new secondary hash, and thereafter performs step SP231 to step SP249 as with the processing routine of step SP51 to step SP69 shown in FIG. 9 and FIG. 10.

Like this, by the primary storage apparatus referring to the statistical information table, searching for the information in an area to be subject to preventive maintenance, and commanding the secondary storage apparatus storing the redundant data of target information to create new redundant data, it is possible to reliability prevent and maintain the occurrence of data damage caused by the aging or failure of the storage apparatus.

(3-6) Case of Partitioning/Consolidating and Storing Data (3-6-1) Data Partitioning Processing The data partitioning processing routine for storing data by partitioning it into a plurality of secondary storage apparatuses when it is not possible to secure the unused capacity of the secondary storage apparatus of the storage destination storing the redundant data is now explained.

Incidentally, with the storage system 1 of FIG. 1, in the data partitioning processing, the primary storage apparatus is illustrated as the storage apparatus 3A storing data as the primary storage apparatus, the secondary storage apparatus is illustrated as the storage apparatuses 3B, 3C storing partitioned redundant data obtained by partitioning the redundant data, and the new secondary storage apparatus is illustrated as the storage apparatus 3N for storing consolidated data obtained by consolidating a plurality of partitioned redundant data. The CPU 301 of the respective storage apparatus 3A to 3N executes data partitioning processing based on the data partitioning program 317 stored in the memory 307.

Figure 20:
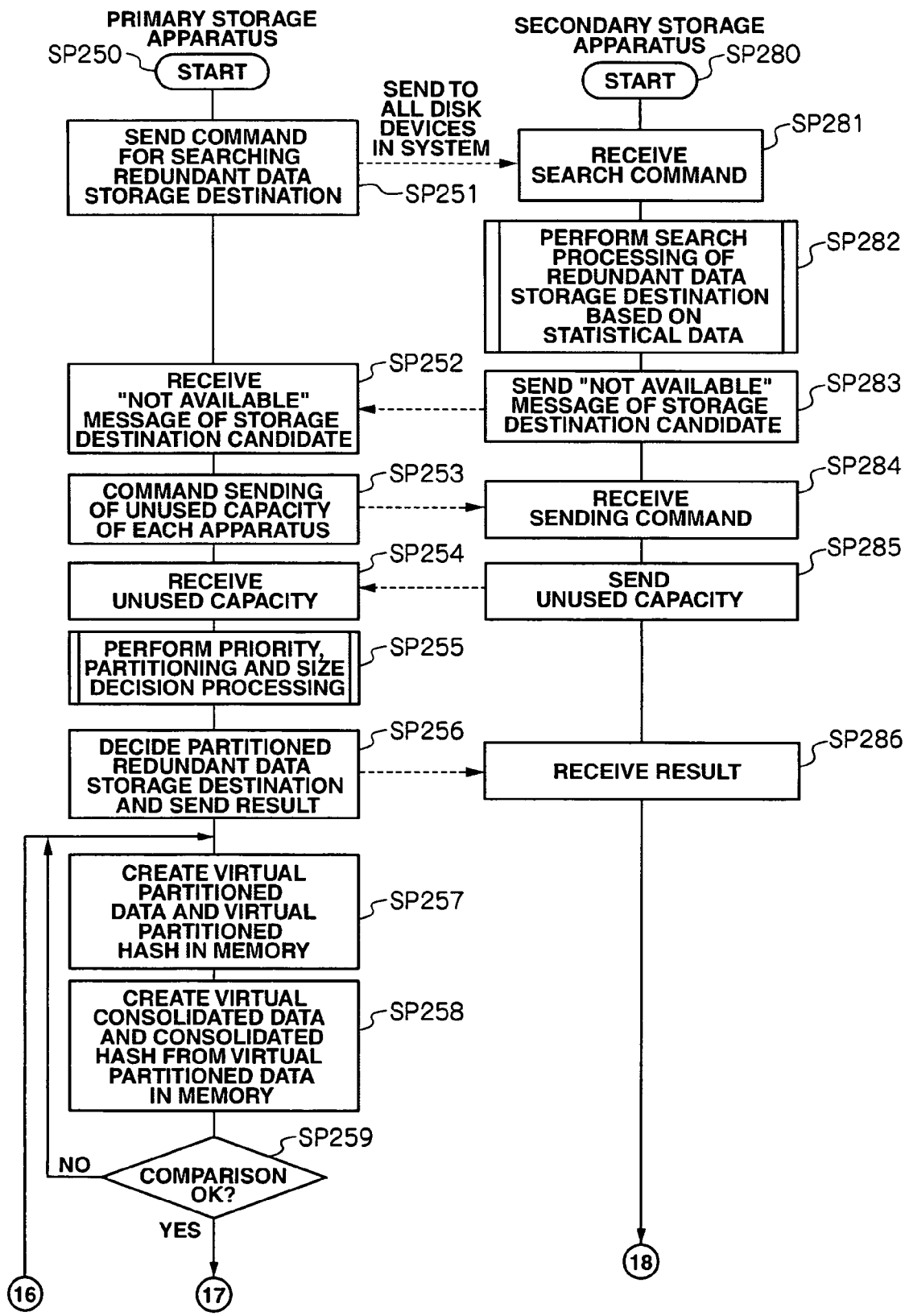
FIG. 20 is a flowchart showing the processing contents of the CPU of the storage apparatus relating to data partitioning processing.
Figure 21:
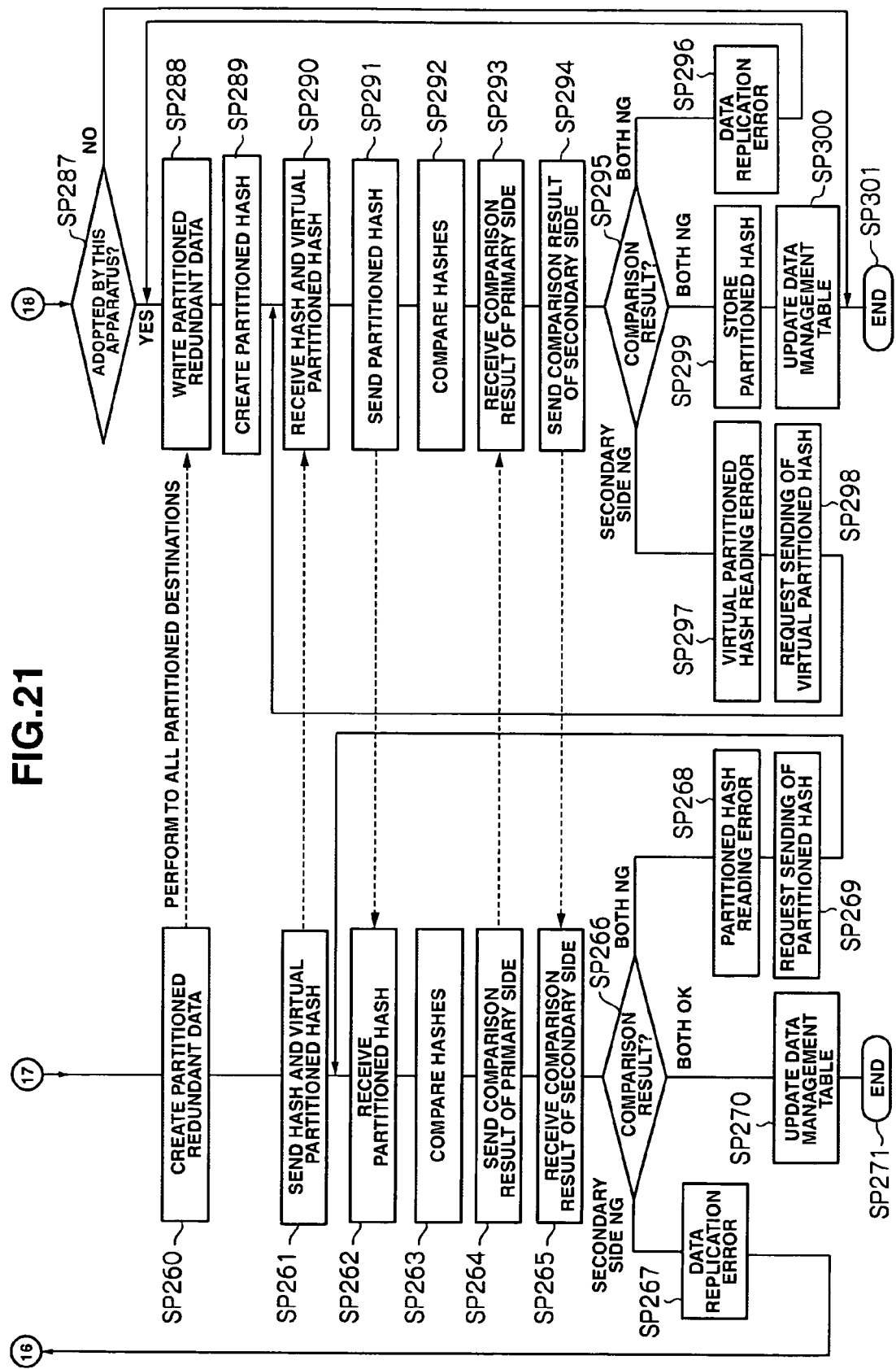
FIG. 21 is a flowchart showing the processing contents of the CPU of the storage apparatus relating to data partitioning processing and data protection processing.

Foremost, FIG. 20 and FIG. 21 show the processing contents of the CPU 301 of the primary storage apparatus 3A, and secondary storage apparatuses 3B, 3C relating to the statistical information management processing.

In other words, the CPU 301 of the primary storage apparatus 3A starts the data partitioning processing when the primary storage apparatus 3A is not able to fully secure the unused capacity of the storage apparatus of the storage destination storing the redundant data (SP250).

Foremost, the CPU 301 of the primary storage apparatus 3A sends a command to all other storage apparatuses 3B to 3N in the storage system 1 excluding the primary storage apparatus 3A to search for the redundant data storage destination (SP251). The CPU 301 of the primary storage apparatus 3A receives a message from the respective storage apparatuses 3B to 3N that there is no storage destination candidate capable of storing the redundant data without partition (SP252). Thereafter, the CPU 301 of the primary storage apparatus 3A commands all storage apparatuses 3B to 3N to send the unused capacity (SP253), and receives the unused capacity from all storage apparatuses 3B to 3N (SP254).

The CPU 301 of the primary storage apparatus 3A executes decision processing for deciding the priority, data partitioning and data size of all storage apparatuses 3B to 3N based on the results of the received unused capacity (SP255). This processing will be explained later with reference to the flowchart of FIG. 22.

Figure 23:
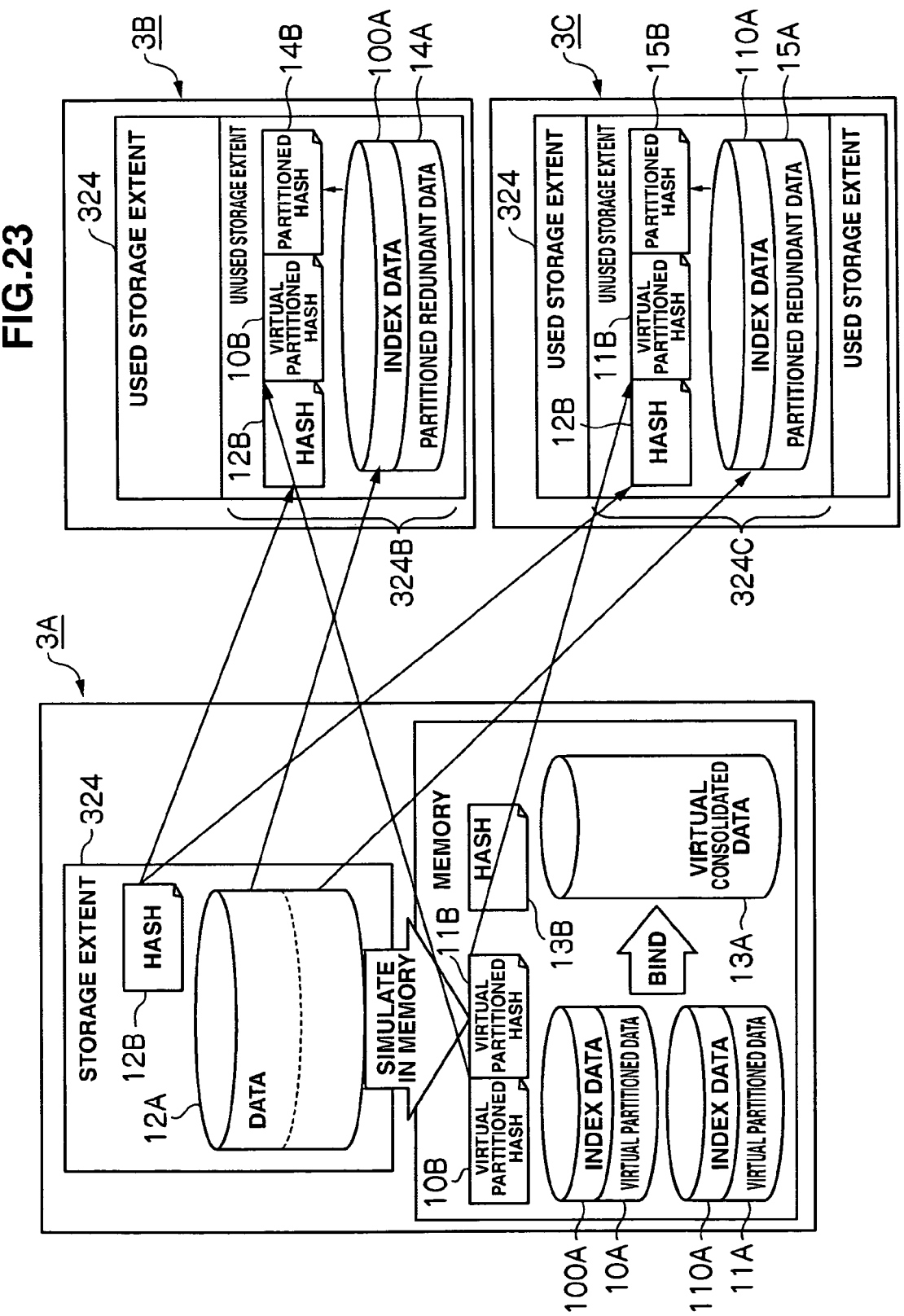
FIG. 23 is an explanatory diagram showing the processing contents of the CPU of the storage apparatus relating to data partitioning processing and data protection processing.

The CPU 301 of the primary storage apparatus 3A decides the storage destination of the partitioned redundant data, and sends the result thereof to all storage apparatuses 3B to 3N (SP256). As shown in FIG. 23, the CPU 301 of the primary storage apparatus 3A creates virtual partitioned data 10A, 11A in the memory 307 of the primary storage apparatus 3A, and virtual partitioned hashes 10B, 11B for each virtual partitioned data 10A, 11A (SP257). Further, the CPU 301 of the primary storage apparatus 3A creates virtual consolidated data 13A and virtual consolidated hash 13B from the virtual partitioned data 10A, 11A stored in the memory 307 of the primary storage apparatus 3A (SP258).

As shown in FIG. 23, before actually partitioning the data 12A, the primary storage apparatus 3A simulates the partitioning processing in the memory 307 of the primary storage apparatus 3A. Here, the virtual partitioned data 10A, 11A are given index data 100A, 110A at the top of the respective virtual partitioned data 10A, 11A for recognizing the order of necessary data during consolidation.

The CPU 301 of the primary storage apparatus 3A simulates the partitioning and consolidation of data in the memory 307 beforehand and determines whether it is possible to retain the authenticity of data (SP259). When the CPU 301 of the primary storage apparatus 3A determines that it is not possible to retain the authenticity of data (SP259: NO), it returns to step SP257. Meanwhile, when the CPU 301 of the primary storage apparatus 3A determines that it is possible to retain the authenticity of data (SP259: YES), it ends the data partitioning processing, and subsequently executes the data protection processing for storing the partitioned redundant data 14A, 15A after the partitioning to the secondary storage apparatuses 3B, 3C at step SP286 onward.

The data partitioning processing regarding the secondary storage apparatuses 3B, 3C is now explained.

In other words, the CPU 301 of the secondary storage apparatuses 3B, 3C starts the data partitioning processing when the primary storage apparatus 3A is not able to fully secure the unused storage extents 324B, 324C of the storage apparatus of the storage destination storing the redundant data (SP280). When the CPU 301 of the secondary storage apparatuses 3B, 3C receives a command from the primary storage apparatus 3A to search for the storage destination of the redundant data (SP281), it executes the search processing of redundant data storage destination based on statistical information (SP282). This search processing will be explained later with reference to the flowchart of FIG. 22.

The CPU 301 of the secondary storage apparatuses 3B, 3C sends a message to the primary storage apparatus 3A to the effect that there is no storage destination candidate for storing the redundant data (SP283). When the CPU 301 of the secondary storage apparatuses 3B, 3C receives a command from the primary storage apparatus 3A to search for the unused capacity of the secondary storage apparatuses 3B, 3C (SP284), it sends the unused capacity to the primary storage apparatus (SP285).

When the CPU 301 of the secondary storage apparatuses 3B, 3C receives from the primary storage apparatus 3A the decision of the storage destination of the partitioned redundant data decided by the primary storage apparatus 3A (SP286), it determines whether the apparatus is adopted as the storage destination of the partitioned data (SP287). When the CPU 301 of the secondary storage apparatuses 3B, 3C determines that the apparatus is not adopted as the storage destination of the partitioned redundant data 14A, 15A (SP287: NO), it ends the data partitioning processing. Meanwhile, when the CPU 301 of the secondary storage apparatuses 3B, 3C determines that the apparatus is adopted as the storage destination of the partitioned redundant data 14A, 15A (SP287: YES), it ends the data partitioning processing, and subsequently executes the data protection processing at step SP288 onward.

(3-6-2) Data Protection Processing

In other words, the CPU 301 of the primary storage apparatus 3A sends the partitioned redundant data 14A, 15A to all secondary storage apparatuses 3B, 3C storing the partitioned redundant data 14A, 15A (SP260).

The CPU 301 of the primary storage apparatus 3A sends to the secondary storage apparatuses 3B, 3C the hash 12B of data for making the data 12A redundant and the virtual partitioned hashes 10B, 11B created in the memory 307 (SP261). The CPU 301 of the primary storage apparatus 3A receives the partitioned hashes 14B, 15B created in the secondary storage apparatuses 3B, 3C (SP262), and compares the virtual partitioned hashes 10B, 11B created in the primary storage apparatus 3A and the partitioned hashes 14B, 15B created in the secondary storage apparatus 3B, 3C (SP263).

The CPU 301 of the primary storage apparatus 3A sends the comparison result to the secondary storage apparatus 3B, 3C (SP264), and receives from the secondary storage apparatuses 3B, 3C the comparison results similarly compared with the secondary storage apparatuses 3B, 3C (SP265).

The CPU 301 of the primary storage apparatus 3A performs step SP266 to step SP271 regarding the processing after the comparison of the partitioned redundant data as with the processing routine of step SP34 to step SP37 and step SP39 and step SP40 as shown in FIG. 10.

The data protection processing regarding the secondary storage apparatuses 3B, 3C is now explained.

In other words, the CPU 301 of the secondary storage apparatuses 3B, 3C receives the partitioned redundant data 14A, 15A created with the primary storage apparatus 3A, writes the partitioned redundant data 14A, 15A in the unused capacity in the unused storage extent 324B, 324C (SP288), and creates the partitioned hashes 14B, 15B of the partitioned redundant data 14A, 15A currently written in the secondary storage apparatus 3B, 3C (SP289).

The CPU 301 of the secondary storage apparatuses 3B, 3C receives the hash 12B of the redundant data of data 12A and the virtual partitioned hashes 10B, 11B from the primary storage apparatus 3A (SP290), and sends the currently created partitioned hashes 14B, 15B to the primary storage apparatus 3A (SP291).

Thereafter, the CPU 301 of the secondary storage apparatus 3B, 3C performs the processing of step SP292 to step SP294 as with step SP263 to step SP265 to be executed with the primary storage apparatus 3A.

The CPU 301 of the secondary storage apparatuses 3B, 3C performs step SP295 to step SP301 regarding the partitioned redundant data 14A, 15A as with the processing routine of step SP63 to step SP69 shown in FIG. 10.

(3-4-3) Data Storage Destination Search Processing

The processing routine for searching the secondary storage apparatus capable of storing the redundant data with the secondary storage apparatuses 3B, 3C is now explained. Although this processing is executed with all storage apparatuses 3B to 3N excluding the primary storage apparatus 3A, for the sake of convenience, the explanation is provided with reference to the application of the secondary storage apparatuses 3B, 3C.

Figure 22:
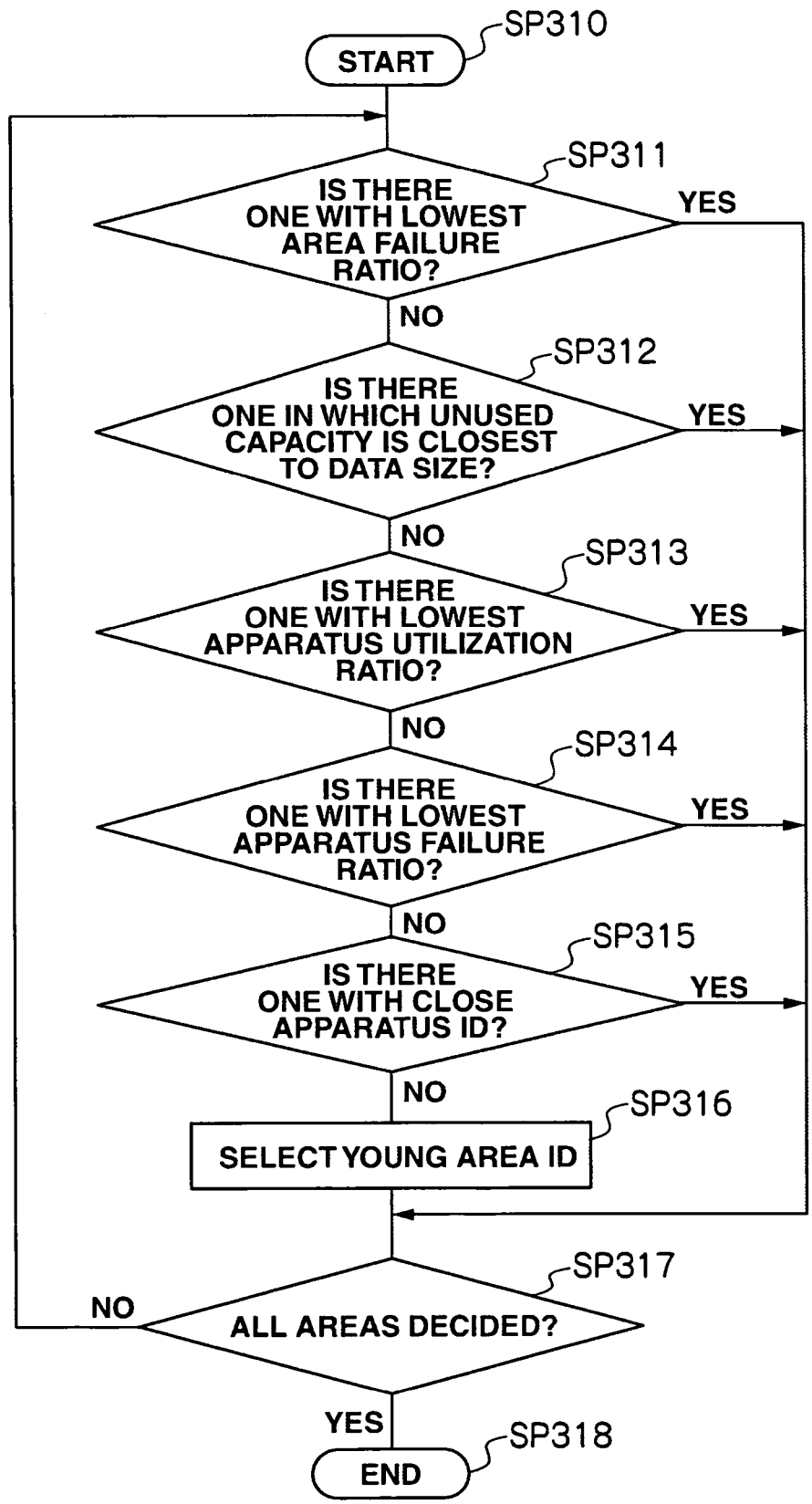
FIG. 22 is an explanatory diagram showing the processing contents of the CPU of the storage apparatus relating to data storage destination search processing.

FIG. 22 is a flowchart showing the processing contents of the secondary storage apparatuses 3B, 3C relating to the data storage destination search processing. In this data storage destination search processing, data storage destination search processing is executed based on the data storage destination search program 313 stored in the memory 307 of the secondary storage apparatuses 3B, 3C so as to search for the secondary storage apparatus to store the redundant data.

The CPU 301 of the secondary storage apparatuses 3B, 3C performs step SP310 to step SP317 in the secondary storage apparatuses 3B, 3C as with step SP70 and step SP73 to step SP78 of the storage destination search processing of redundant data shown in FIG. 11. The CPU 301 of the secondary storage apparatus 3B, 3C searches all areas to become the storage destination of the redundant data, and determines whether the storage destination of redundant data will be decided in the area (SP317). When the CPU 301 of the secondary storage apparatus 3B, 3C determines that a decision is not made in all areas (SP317: NO), it returns to step 311 once again, and, contrarily, when the CPU 301 of the secondary storage apparatus 3B, 3C determines that a decision has been made in all areas (SP317: YES), it proceeds to step SP256 shown in FIG. 20, and thereafter performs the subsequent data partitioning processing.

Like this, the primary storage apparatus 3A is able to create a virtual partitioned hash as the virtual partitioned authentic information showing that the virtual partitioned redundant data in the memory is authentic, the secondary storage apparatuses 3B, 3C are able to create a partitioned hash as the partitioned authentic information showing that the partitioned redundant data, and the secondary storage apparatus is able to store the partitioned redundant data in the storage extent of the secondary storage apparatus when the virtual partitioned hash and the partitioned hash coincide.

Further, with the storage system according to the present embodiment, since a virtual partitioned hash is sent to the secondary storage apparatus together with the index data created in the memory during the simulation, it is possible to maintain the redundancy and authenticity of data even in limited storage systems.

(3-6-4) Data Consolidation Processing

The data consolidation processing when partitioned redundant data 14A, 15A are stored in a plurality of secondary storage apparatuses 3B, 3C, the partitioned redundant data 14A, 15A are to be consolidated and consolidated redundant data 1NA is to be stored in the storage extent of the new secondary storage apparatus 3N is now explained.

Figure 24:
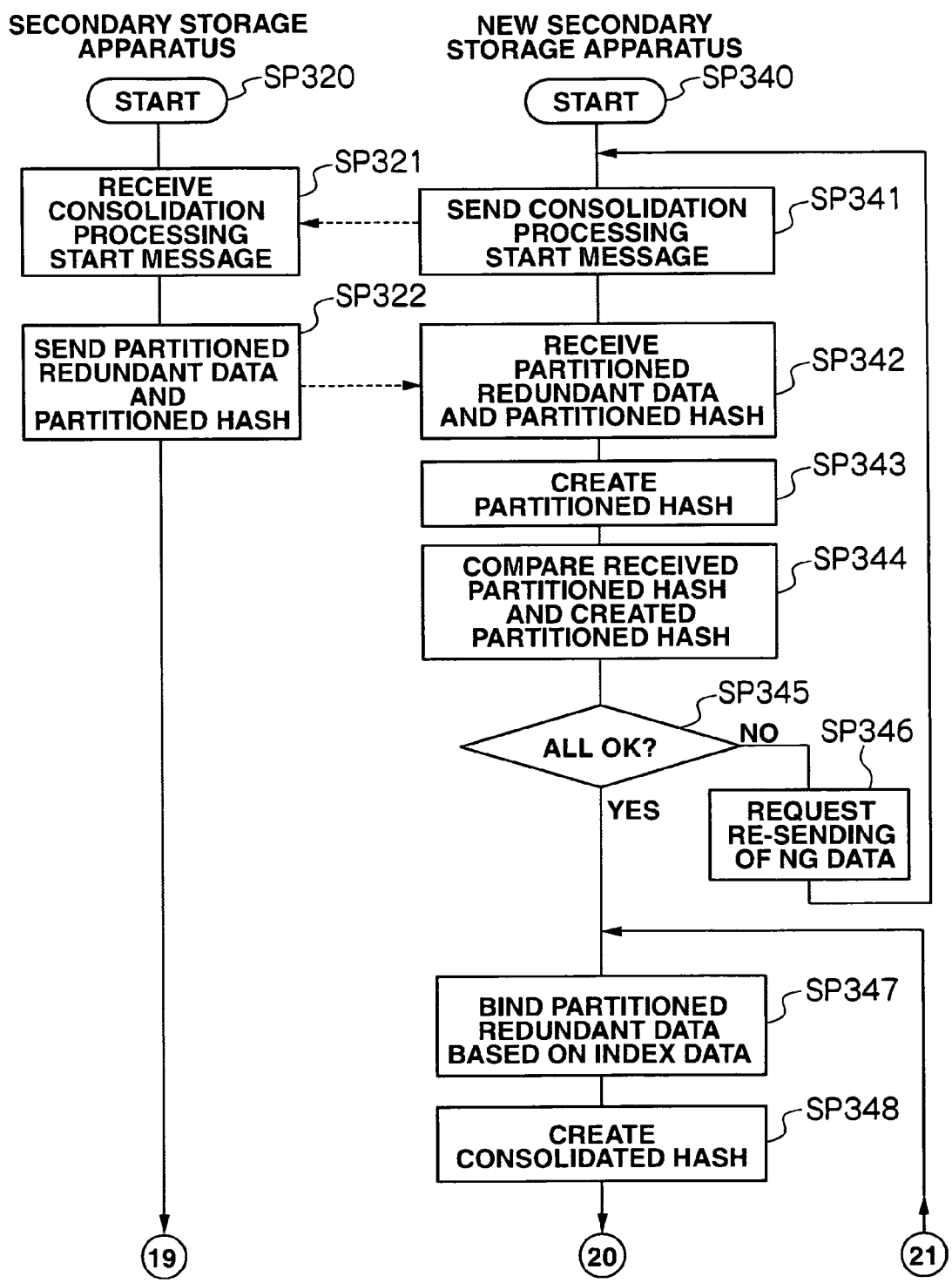
FIG. 24 is a flowchart showing the processing contents of the CPU of the storage apparatus relating to data consolidation processing.
Figure 25:
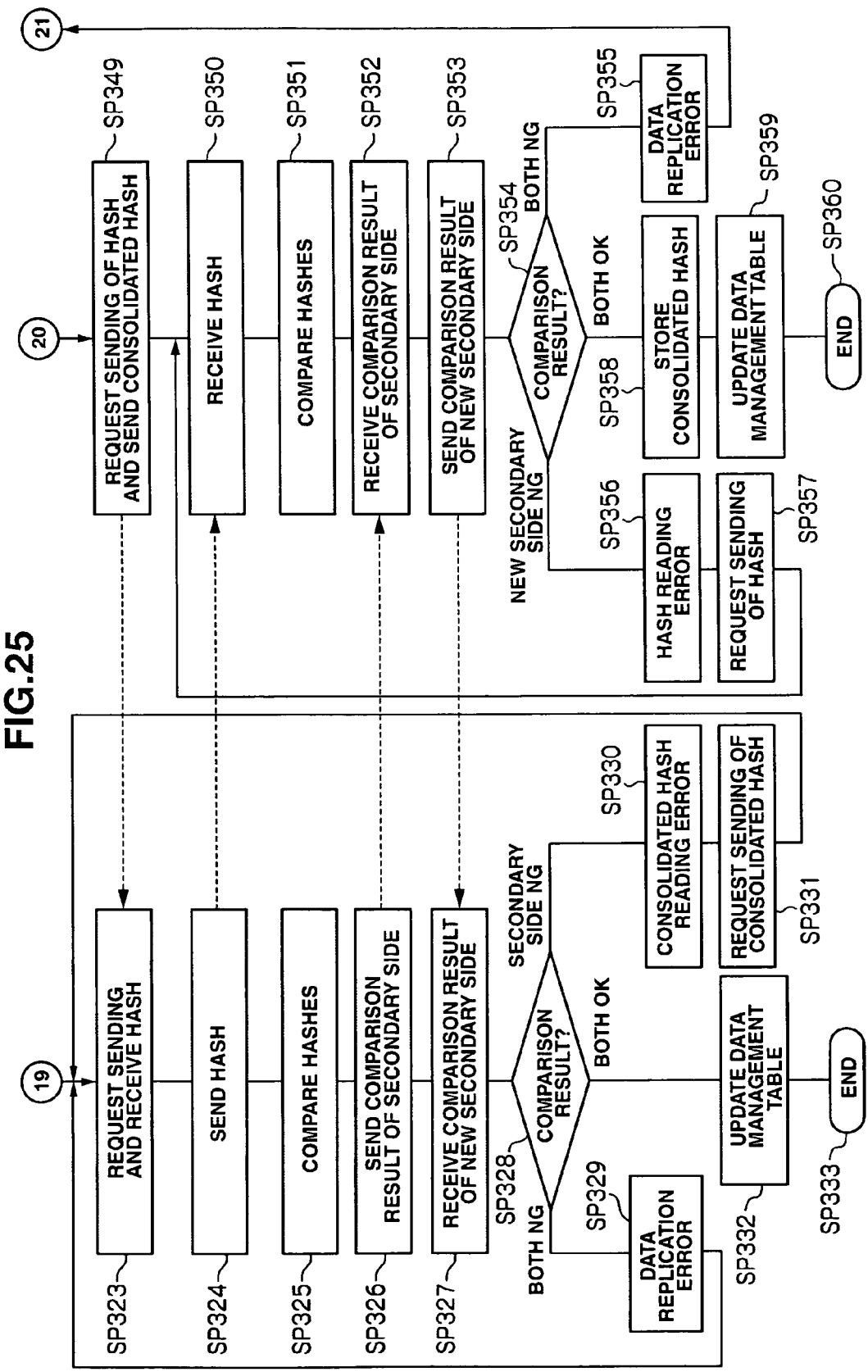
FIG. 25 is a flowchart showing the processing contents of the CPU of the storage apparatus relating to data consolidation processing and data protection processing.

Foremost, FIG. 24 and FIG. 25 show the processing contents of the CPU 301 of the new secondary storage apparatus 3N when consolidating the plurality of secondary storage apparatuses 3B, 3C having the partitioned redundant data 14A, 15A, and the partitioned redundant data 14A, 15A regarding the data consolidation processing and storing this as consolidated redundant data 1NA. In this processing, the data consolidation processing is executed based on the data consolidation program 318 stored in the memory 307 of the respective secondary storage apparatuses 3B, 3C, 3N.

In other words, the CPU 301 of the secondary storage apparatuses 3B, 3C starts the data consolidation processing when sending a command to the new secondary storage apparatus 3N for creating consolidated redundant data 1NA (SP320). When the CPU 301 of the secondary storage apparatuses 3B, 3C receives the message of starting consolidation processing from the new secondary storage apparatus 3N (SP321), it sends the partitioned redundant data 14A, 15A and the partitioned hashes 14B, 15B to the new secondary storage apparatus 3N (SP322).

The CPU of the secondary storage apparatus 3B, 3C receives a request from the new secondary storage apparatus 3N to send the hash 12B before partition created with the primary storage apparatus 3A, and simultaneously receives the consolidated hash 1NB created with the new secondary storage apparatus 3N (SP323), and sends the hash 12B before partition to the new secondary storage apparatus 3N (SP324).

Thereafter, the CPU 301 of the secondary storage apparatuses 3B, 3C performs step SP325 to step SP333 as with the processing of step SP263 to step SP271 performed in the data partitioning processing shown in FIG. 21.

The secondary storage apparatuses 3B, 3C end the data consolidation processing.

The data consolidation processing in the new secondary storage apparatus 3N is now explained with respect to FIG. 26.

In other words, the CPU 301 of the new secondary storage apparatus 3N starts the data consolidation processing based on a command sent from the secondary storage apparatus 3B, 3C to create the consolidated redundant data 1NA (SP340).

When the CPU 301 of the new secondary storage apparatus 3N sends a message for starting the data consolidation processing to the secondary storage apparatuses 3B, 3C (SP341), it receives the partitioned redundant data 14A, 15A and partitioned hashes 14B, 15B from the secondary storage apparatuses 3B, 3C (SP342). Thereafter, the CPU 301 of the new secondary storage apparatus 3N creates a current partitioned hash based on the received partitioned redundant data 14A, 15A (SP343), and compares the partitioned hashes 14B, 15B received from the secondary storage apparatus 3B, 3C, and the current partitioned hash (SP344).

The CPU 301 of the new secondary storage apparatus 3N determines whether all partitioned hashes 14B, 15B received from the secondary storage apparatuses 3B, 3C with all partitioned redundant data and the current partitioned hash coincide (SP345). When the CPU 301 of the new secondary storage apparatus 3N determines that they do not all coincide (SP345: NO), it requests the secondary storage apparatuses 3B, 3C to resend the partitioned redundant data based on the partitioned hash that did not coincide (SP346), and returns to step SP341.

Meanwhile, when the CPU 301 of the new secondary storage apparatus 3N determines that they are all coinciding (SP345: YES), it consolidates the partitioned redundant data based on the index data 100A, 110A given to the respective partitioned redundant data 14A, 15A, and creates the consolidated redundant data 1NA (SP347).

The CPU 301 of the new secondary storage apparatus 3N creates a consolidated hash of the consolidated redundant data 1AN (SP348), requests the secondary storage apparatuses 3B, 3C to send the hash 12B before partitioning, and simultaneously sends the created consolidated hash 1NB to the secondary storage apparatuses 3B, 3C (SP349).

Thereafter, when the CPU 301 of the new secondary storage apparatus 3N receives the hash 12B before partition from the secondary storage apparatuses 3B, 3C (SP350), it performs step SP351 to step SP360 as with the processing of step SP292 to step SP301 in the data partitioning processing of FIG. 21, and ends this data consolidation processing.

Like this, after searching the unused capacity of all storage apparatuses excluding the primary storage apparatus, it is possible to for the new secondary storage apparatus to create consolidated redundant data and a consolidated hash as the consolidated authentic information, and the new secondary storage apparatus is able to store the consolidated redundant data in the storage extent of the new secondary storage apparatus when the primary-side authentic information and the consolidated authentic information coincide.

Further, with the storage system according to the present embodiment, since the partitioned hash of the partitioned authentic information created for each partitioned redundant data and the index data required for the consolidation are sent from the secondary storage apparatus storing the partitioned redundant data to the new secondary storage apparatus, and the consolidated redundant data is stored therein, it is possible to maintain the redundancy and authenticity of data even in a limited storage system.

(3-7) Effect of Present Embodiment

As described above, according to the storage system of the present embodiment, it is possible to automatically and flexibly change the redundant destination of data, and verify the authenticity of data when the system is changed.

(4) Other Embodiments

Incidentally, in the foregoing embodiment, although a case was explained where the primary storage apparatus 3A used the CPU 301 of the primary storage apparatus to configure the search unit for searching the secondary storage apparatus 3B for storing redundant data, a primary creation unit for creating primary-side authentic information showing that the data is authentic, and a primary storage unit for storing data in a storage extent of the primary storage apparatus, and the secondary storage apparatus used the CPU 301 of the secondary storage apparatus to configure a secondary creation unit for creating secondary-side authentic information showing that the redundant data is authentic, and a secondary storage unit for storing the redundant data in a storage extent of the secondary storage apparatus, the present invention is not limited thereto, and the search unit, primary creation unit, primary storage unit, secondary creation unit, and secondary storage unit may be respectively configured as individual hardware.

The present invention may be widely applied to a storage system having one or more storage apparatuses or various other modes of storage systems.

We claim:

1. A storage system comprising:
at least two or more primary storage apparatuses having a storage extent for storing data; and
a plurality of secondary storage apparatuses having redundant data of said data,
wherein said primary storage apparatus comprises:
a search unit for searching a secondary storage apparatus for storing said redundant data under a predetermined condition, and
a primary creation unit for creating primary-side authentic information showing that said data is authentic;
wherein said secondary storage apparatus comprises:
a secondary creation unit for creating secondary-side authentic information showing that said redundant data is authentic;
wherein said storage apparatus compares said primary-side authentic information and said secondary-side authentic information;
wherein said storage system further comprises:
a primary storage controller for storing said data in a storage extent of said primary storage apparatus and a secondary storage controller for storing said redundant data in a storage extent of said secondary storage apparatus when said primary-side authentic information and said secondary-side authentic information coincide according to the comparison;
wherein said primary creation unit comprises:
a primary virtual creation unit for virtually creating virtual partitioned redundant data corresponding to partitioned redundant data in said primary storage apparatus before storing said partitioned redundant data, which is obtained by partitioning said redundant data, in a storage extent of said secondary storage apparatus when it determines that said redundant data of said data cannot be stored in a storage extent of said secondary storage apparatus, and
a virtual partitioned authentic information creation unit for creating virtual partitioned authentic information showing that said virtual partitioned redundant data is authentic;
wherein said secondary creation unit comprises:
a partitioned authentic information creation unit for creating partitioned authentic information showing that said partitioned redundant data is authentic;
wherein said storage system further comprises:
a partitioned redundant storage unit for storing said partitioned redundant data in a storage extent of said secondary storage apparatus when said virtual partitioned authentic information and said partitioned authentic information coincide;
wherein said secondary storage apparatus is comprised of a plurality of secondary storage apparatuses;
wherein said secondary creation unit comprises:
a consolidated redundancy creation unit for creating consolidated redundant data formed by consolidating said partitioned redundant data with secondary storage apparatuses other than the secondary storage apparatus storing said partitioned redundant data,
a consolidated authentic information creation unit for creating consolidated authentic information showing that said consolidated redundant data is authentic, and
a consolidated redundancy storage unit for storing said consolidated redundant data in a storage extent of said other secondary storage apparatuses when said primary-side authentic information and said consolidated authentic information coincide;
wherein said primary storage apparatus searches said plurality of second storage apparatuses for a secondary storage apparatus which meets predetermined requirements;
wherein said predetermined requirements for a secondary storage apparatus includes:
(1) that the secondary storage apparatus must have a capacity that is closest to the data size of the data that is to be stored in the primary storage apparatus,
(2) that the secondary storage apparatus must have a lowest ratio of apparatus or storage area failures as set forth to information stored in a total information table, and
(3) the secondary storage apparatus must have a lowest apparatus utilization ratio.

2. The storage system according to claim 1, wherein said search unit searches said secondary storage apparatuses for storing said redundant data by sending to said secondary storage apparatuses individual identifying information that is given to said primary storage apparatus among individual identifying information given respectively to all storage apparatuses and which recognizes the respective storage apparatuses.

3. The storage system according to claim 1, wherein when a storage apparatus connected to a host system receives data from the host system, the storage system selects, from among a plurality of storage apparatuses, a storage apparatus that becomes a primary storage apparatus, and
wherein the selected primary storage apparatus selects a secondary storage apparatus to store the redundant data.

4. A data storage method of a storage system comprising at least two or more primary storage apparatuses having a storage extent for storing data and a plurality of secondary storage apparatuses having redundant data of said data, said data storage method comprising the steps of:

said primary storage apparatus searching a secondary storage apparatus for storing said redundant data under a predetermined condition; and said primary storage apparatus creating primary-side authentic information showing that said data is authentic;

said secondary storage apparatus creating secondary-side authentic information showing that said redundant data is authentic;

comparing said primary-side authentic information and said secondary-side authentic information; and storing said data in a storage extent of said primary storage apparatus and storing said redundant data in a storage extent of said secondary storage apparatus when said primary-side authentic information and said secondary-side authentic information coincide according to the comparing step;

wherein said creating primary-side authentic information is performed by a primary creation unit which comprises:

a primary virtual creation unit for virtually creating virtual partitioned redundant data corresponding to partitioned redundant data in said primary storage apparatus before storing said partitioned redundant data, which is obtained by partitioning said redundant data, in a storage extent of said secondary storage apparatus when it determines that said redundant data of said data cannot be stored in a storage extent of said secondary storage apparatus, and a virtual partitioned authentic information creation unit for creating virtual partitioned authentic information showing that said virtual partitioned redundant data is authentic;

wherein said creating secondary-side authentic information is performed by a secondary creation unit which comprises:

a partitioned authentic information creation unit for creating partitioned authentic information showing that said partitioned redundant data is authentic;

wherein said storage system further comprises:

a partitioned redundant storage unit for storing said partitioned redundant data in a storage extent of said secondary storage apparatus when said virtual partitioned authentic information and said partitioned authentic information coincide;

wherein said secondary storage apparatus is comprised of a plurality of secondary storage apparatuses;

wherein said secondary creation unit comprises:

a consolidated redundancy creation unit for creating consolidated redundant data formed by consolidating said partitioned redundant data with secondary storage apparatuses other than the secondary storage apparatus storing said partitioned redundant data, a consolidated authentic information creation unit for creating consolidated authentic information showing that said consolidated redundant data is authentic, and a consolidated redundancy storage unit for storing said consolidated redundant data in a storage extent of said other secondary storage apparatuses when said primary-side authentic information and said consolidated authentic information coincide;

wherein said primary storage apparatus searches said plurality of second storage apparatuses for a secondary storage apparatus which meets predetermined requirements;

wherein said predetermined requirements for a secondary storage apparatus includes:

(1) that the secondary storage apparatus must have a capacity that is closest to the data size of the data that is to be stored in the primary storage apparatus, (2) that the secondary storage apparatus must have a lowest ratio of apparatus or storage area failures as set forth to information stored in a total information table, and (3) the secondary storage apparatus must have a lowest apparatus utilization ratio.

5. The data storage method according to claim 4, wherein, at said searching step, said primary storage apparatus searches said secondary storage apparatuses for storing said redundant data by sending to said secondary storage apparatuses individual identifying information that is given to one's own storage apparatus among individual identifying information given respectively to all storage apparatuses and which recognizes the respective storage apparatuses.

6. The data storage method according to claim 4, wherein when a storage apparatus connected to a host system receives data from the host system, the storage system selects, from among a plurality of storage apparatuses, a storage apparatus that becomes a primary storage apparatus, and wherein the selected primary storage apparatus selects a secondary storage apparatus to store the redundant data.

* * * * *